(12) United States Patent
Kawachi et al.

(10) Patent No.: US 9,940,890 B2
(45) Date of Patent: Apr. 10, 2018

(54) LIQUID CRYSTAL DISPLAY DEVICE

(71) Applicant: Panasonic Liquid Crystal Display Co., Ltd., Himeji-shi, Hyogo (JP)

(72) Inventors: Genshiro Kawachi, Osaka (JP); Kazuo Kita, Osaka (JP)

(73) Assignee: Panasonic Liquid Crystal Display Co., Ltd., Osaka (JP)

( * ) Notice: Subject to any disclaimer, the term of this patent is extended or adjusted under 35 U.S.C. 154(b) by 0 days.

(21) Appl. No.: 15/707,575

(22) Filed: Sep. 18, 2017

(65) Prior Publication Data

US 2018/0005595 A1 Jan. 4, 2018

Related U.S. Application Data

(63) Continuation of application No. 14/512,001, filed on Oct. 10, 2014, now Pat. No. 9,792,870, which is a continuation of application No. PCT/JP2013/001727, filed on Mar. 14, 2013.

(30) Foreign Application Priority Data

May 28, 2012 (JP) .................. 2012-121406

(51) Int. Cl.
G09G 3/36 (2006.01)
G02F 1/1345 (2006.01)

(52) U.S. Cl.
CPC ....... *G09G 3/3677* (2013.01); *G02F 1/13452* (2013.01); *G09G 2300/0417* (2013.01); *G09G 2300/0426* (2013.01); *G09G 2300/0814* (2013.01); *G09G 2310/0213* (2013.01)

(58) Field of Classification Search
CPC ............. H01L 27/3244; H01L 27/3276; H01L 27/3262; G09G 3/3233; G09G 3/3648
See application file for complete search history.

(56) References Cited

U.S. PATENT DOCUMENTS

| | | | |
|---|---|---|---|
| 2004/0066361 | A1 | 4/2004 | Ishii et al. |
| 2004/0090398 | A1 | 5/2004 | Takeuchi |
| 2006/0221040 | A1 | 10/2006 | Pak et al. |
| 2006/0267909 | A1 | 11/2006 | Hsu et al. |
| 2006/0279478 | A1 | 12/2006 | Ikegami |

(Continued)

FOREIGN PATENT DOCUMENTS

| | | |
|---|---|---|
| JP | 3-031893 | 2/1991 |
| JP | 6-347753 | 12/1994 |

(Continued)

*Primary Examiner* — Gerald Johnson
(74) *Attorney, Agent, or Firm* — Hamre, Schumann, Mueller & Larson, P.C.

(57) ABSTRACT

Provided is a liquid crystal display device, including: a plurality of scanning connection lines formed on at least one side of edges of the image display region, the plurality of scanning connection lines connecting together a scanning signal drive circuit and a plurality of scanning signal lines; a selection circuit formed so as to be interposed between the plurality of scanning connection lines and the plurality of scanning signal lines, the selection circuit being configured to selectively short-circuit one of a plurality of the scanning signal lines to one of the plurality of scanning connection lines based on a selection signal; and a selection signal line connected to the selection circuit, the selection signal line transmitting the selection signal to the selection circuit.

13 Claims, 26 Drawing Sheets

(56) References Cited

U.S. PATENT DOCUMENTS

| | | | |
|---|---|---|---|
| 2007/0052658 | A1 | 3/2007 | Kim |
| 2008/0191980 | A1 | 8/2008 | Jeon |
| 2008/0309232 | A1 | 12/2008 | Yamamoto |
| 2008/0316159 | A1 | 12/2008 | Qi |
| 2010/0001929 | A1 | 1/2010 | Kawabe |
| 2010/0079435 | A1 | 4/2010 | Yasuda |
| 2010/0157189 | A1 | 6/2010 | Ma |
| 2010/0225770 | A1 | 9/2010 | Morimoto |
| 2010/0265226 | A1 | 10/2010 | Yasuda |
| 2011/0032284 | A1 | 2/2011 | Owaku |
| 2012/0026420 | A1 | 2/2012 | Saitoh |
| 2013/0271357 | A1 | 10/2013 | Wang |

FOREIGN PATENT DOCUMENTS

| | | |
|---|---|---|
| JP | 2000-227784 | 8/2000 |
| JP | 2004-258245 | 9/2004 |
| JP | 2006-285233 | 10/2006 |
| JP | 2006-330682 | 12/2006 |
| JP | 2007-072463 | 3/2007 |
| JP | 2008-077007 | 4/2008 |
| JP | 2008-197643 | 8/2008 |
| JP | 2009-050118 | 3/2009 |
| JP | 2010-015050 | 1/2010 |
| JP | 2010-250134 | 11/2010 |
| JP | 2011-039234 | 2/2011 |
| JP | 2012-032608 | 2/2012 |
| WO | 94/25954 | 11/1994 |

LIQUID CRYSTAL DISPLAY DEVICE

CROSS-REFERENCE TO RELATED APPLICATION

This application is Bypass Continuation of international patent application PCT/JP2013/001727, filed: Mar. 14, 2013 designating the United States of America, the entire disclosure of which is incorporated herein by reference. Priority is claimed based on Japanese patent application JP2012-121406, filed: May 28, 2012. The entire disclosure of Japanese patent application JP2012-121406 is incorporated herein by reference in its entirety.

TECHNICAL FIELD

This application relates to a liquid crystal display device.

BACKGROUND

In a general liquid crystal display device, a drive circuit is formed outside an image display region that is a region in which a large number of pixels are arranged to form an image to be displayed. The drive circuit is configured to apply, to scanning signal lines connected to gates of thin film transistors (TFTs) formed so as to correspond to the respective pixels, signals for controlling on and off of the TFTs. For example, in Japanese Patent Application Laid-open No. 2012-32608, there is disclosed a liquid crystal display device in which drive circuits formed of TFTs are arranged on both right and left sides of a display region.

In the liquid crystal display device, it is demanded to achieve higher resolution, which corresponds to increasing the number of pixels in the image display region, and to achieve a narrower frame, which corresponds to reducing the size of a region outside the image display region.

In view of this, when the drive circuit for the scanning signal lines is formed in an outer region of the display device as in the above-mentioned liquid crystal display device disclosed in Japanese Patent Application Laid-open No. 2012-32608, materials for forming the drive circuit are limited, and hence the drive circuit cannot be downsized beyond a certain limit. This becomes prominent when the materials forming the drive circuit have relatively small electron mobility, such as amorphous silicon. Therefore, there is a limit on achieving a narrower frame in the configuration in which the drive circuit for the scanning signal lines is formed in the outer region of the display device, and it is difficult to further reduce the frame width in the related art.

On the other hand, when the scanning signal lines are individually connected to an integrated circuit with use of wiring made of a material having large electric conductivity, such as a metal, the number of the scanning signal lines to be connected is considerably increased in order to achieve higher resolution in the image display region. A region for arranging such wiring increases in size, and hence it is still difficult to reduce the frame width in the related art.

This application has been made in view of the above-mentioned circumferences, and has an object to achieve a narrower frame in the liquid crystal display device while maintaining the resolution.

SUMMARY

Embodiments disclosed in this application have various aspects, and representative aspects among them may be summarized as follows.

(1) According to one embodiment of this application, there is provided a liquid crystal display device, including: an image display region including a plurality of pixels sectioned by a plurality of scanning signal lines and a plurality of video signal lines; a scanning signal drive circuit formed on at least one side of edges of the image display region, which are parallel to the plurality of scanning signal lines; a plurality of scanning connection lines formed on at least one side of edges of the image display region, which are parallel to the plurality of video signal lines, the plurality of scanning connection lines connecting together the scanning signal drive circuit and the plurality of scanning signal lines; a selection circuit formed so as to be interposed between the plurality of scanning connection lines and the plurality of scanning signal lines, the selection circuit being configured to selectively short-circuit one of a plurality of the scanning signal lines to one of the plurality of scanning connection lines based on a selection signal; and a plurality of selection signal lines connected to the selection circuit, the plurality of selection signal lines transmitting the selection signal to the selection circuit.

(2) In the liquid crystal display device according to Item (1), the selection circuit is configured to connect one of the plurality of scanning connection lines to a plurality of the scanning signal lines via TFTs, the TFTs are formed for the plurality of the scanning signal lines, respectively, and the plurality of selection signal lines are connected to gate electrodes of the TFTs.

(3) In the liquid crystal display device according to Item (1) or (2), the selection circuit is formed between the image display region and the plurality of scanning connection lines so as to be parallel to the plurality of video signal lines.

(4) The liquid crystal display device according to any one of Items (1) to (3) further includes a selection canceling circuit formed on the other side of the edges of the image display region, which are parallel to the plurality of video signal lines, the selection canceling circuit being configured to selectively short-circuit corresponding one of the plurality of scanning signal lines to one of a plurality of selection canceling signal line based on the selection signal.

(5) In the liquid crystal display device according to Item (4), the selection canceling circuit is configured to connect the selection canceling signal line to the plurality of scanning signal lines via TFTs, the TFTs are formed for the plurality of scanning signal lines, respectively, and the plurality of selection signal lines are connected to gate electrodes of the TFTs.

(6) In the liquid crystal display device according to Item (4) or (5), the selection circuit and the selection canceling circuit are formed on one side of the edges of the image display region, which are parallel to the plurality of video signal lines, the selection canceling circuit is formed on the other side of the edges of the image display region, which are parallel to the plurality of video signal lines, at a position opposing the selection circuit arranged on the one side, and the selection circuit is formed on the other side of the edges of the image display region, which are parallel to the plurality of video signal lines, at a position opposing the selection canceling circuit arranged on the one side.

(7) In the liquid crystal display device according to Item (6), a plurality of the selection circuits and a plurality of the selection canceling circuits are alternatively formed on one side of the edges of the image display region, which are parallel to the plurality of video signal lines, each of the plurality of the selection canceling circuits is formed on the other side of the edges of the image display region, which are parallel to the plurality of video signal lines, at a position opposing each of the plurality of the selection circuits arranged on the one side, and each of the plurality of the selection circuits is formed on the other side of the edges of the image display region, which are parallel to the plurality of video signal lines, at a position opposing each of the plurality of the selection canceling circuits arranged on the one side.

(8) In the liquid crystal display device according to any one of Items (4) to (7), the plurality of scanning signal lines are divided into n groups, where n is a natural number of 2 or more, a number of the plurality of scanning connection lines is 1/n of a number of the plurality of scanning signal lines, the selection signal selects an m-th group of the n groups, the selection circuit is configured to short-circuit corresponding one of the plurality of scanning connection lines to corresponding one of the plurality of scanning signal lines, which belongs to the m-th group, and the selection canceling circuit is configured to short-circuit the selection canceling signal line to corresponding one of the plurality of scanning signal lines, which belongs to the (m−1)th group. Note that, when m−1 is 0, the selection canceling circuit short-circuits the selection canceling signal line to corresponding one of the plurality of scanning signal lines, which belongs to an n-th group.

(9) The liquid crystal display device according to any one of Items (1) to (8) further includes a sealing material for bonding an array substrate and a color filter substrate to each other, the sealing material being formed at a position overlapping with the plurality of scanning connection lines and the selection circuit in plan view.

(10) In the liquid crystal display device according to any one of Items (1) to (9), a supply start timing to supply the selection signal to each of the selection signal lines is earlier than a supply start timing to supply a signal voltage corresponding to a pixel value via corresponding one of the plurality of video signal lines to corresponding one of the plurality of pixels, which corresponds to the each of the selection signal lines.

(11) The liquid crystal display device according to any one of Items (1) to (10) further includes an insulating film interposed between the selection circuit and the selection signal lines, in which the selection circuit and the selection signal lines overlap with each other in plan view, and the selection circuit and the selection signal lines are connected to each other via holes formed through the insulating film.

(12) In the liquid crystal display device according to any one of Items (1) to (11), a width of corresponding one of the plurality of scanning connection lines, which is connected to corresponding one of the plurality of scanning signal lines located relatively farther from the scanning signal drive circuit, is larger than a width of corresponding one of the plurality of scanning connection lines, which is connected to corresponding one of the plurality of scanning signal lines located relatively closer to the scanning signal drive circuit.

(13) The liquid crystal display device according to any one of Items (1) to (12) further includes a reverse voltage application circuit configured to apply, to the selection circuit, a voltage having a polarity opposite to a polarity of the selection signal during a non-display period in which no image is displayed in the image display region.

(14) In the liquid crystal display device according to any one of Items (1) to (13), the selection circuit is configured to selectively short-circuit one of a plurality of the scanning signal lines to each of the plurality of scanning connection lines during a selection period in which one of a plurality of the selection signal lines is selected by the selection signal.

(15) In the liquid crystal display device according to Item (14), the scanning signal drive circuit is configured to sequentially output a pulse signal to the each of the plurality of scanning connection lines during the selection period in which one of the plurality of the selection signal lines is selected by the selection signal.

(16) In the liquid crystal display device according to Item (15), the plurality of scanning connection lines, the selection circuit, and the selection signal line are arranged on each of both sides of the edges of the image display region, which are parallel to the plurality of video signal lines, and the plurality of scanning connection lines are connected to both end portions of each of the plurality of scanning signal lines.

(17) In the liquid crystal display device according to Item (16), the selection signal is alternately supplied to the selection circuits arranged on the both sides of the edges of the image display region, which are parallel to the plurality of video signal lines.

(18) The liquid crystal display device according to Item (17) further includes a reverse voltage application circuit configured to apply a voltage having a polarity opposite to a polarity of the selection signal to the selection circuit not supplied with the selection signal among the selection circuits arranged on both sides of the edges of the image display region, which are parallel to the plurality of video signal lines.

According to the respective aspects of this application, a narrower frame can be achieved while maintaining the resolution.

DETAILED DESCRIPTION

Now, embodiments of this application are described with reference to the drawings.

Figure 1A:
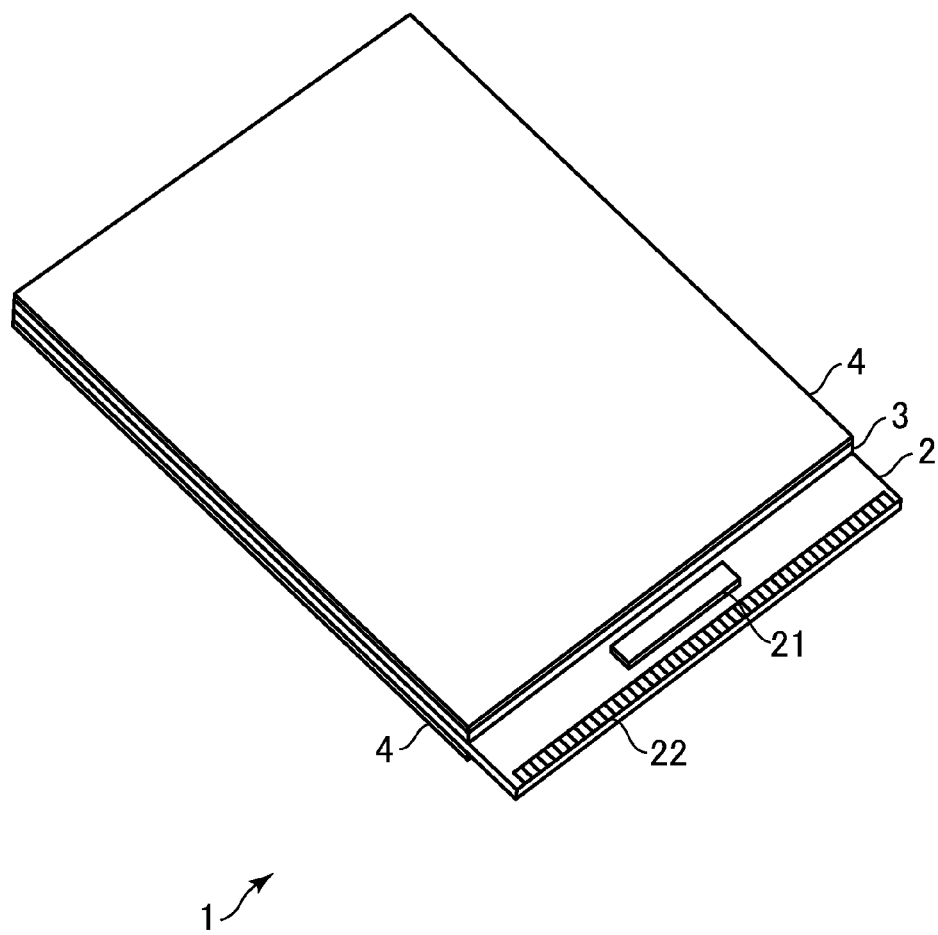
FIG. 1A is an external perspective view of a liquid crystal display device according to an embodiment of this application.

FIG. 1A is an external perspective view of a liquid crystal display device 1 according to an embodiment of this application. The liquid crystal display device 1 has a structure in which a liquid crystal material with a thickness of about several micrometers is sandwiched between an array substrate 2 and a color filter substrate 3. A sealing material formed along an outer periphery of the color filter substrate 3 bonds the color filter substrate 3 to the array substrate 2 so as to seal the liquid crystal material without leakage.

The array substrate 2 is a glass substrate including, on a front surface thereof, a large number of switching elements and pixel electrodes formed in matrix. When TFTs are used as the switching elements, the array substrate 2 is also called a TFT substrate. The array substrate 2 has a larger outer shape than that of the color filter substrate 3 as illustrated in FIG. 1A, and at least one side of the array substrate 2 is extended out with respect to the color filter substrate 3 so that the front surface thereof is exposed. On the exposed part of the front surface of the array substrate 2, a driver IC 21 is mounted, which is a control circuit for controlling on and off of the large number of switching elements and video signals to be applied to the respective pixel electrodes. In addition, on the exposed part, a connection terminal 22 is formed so as to electrically connect the liquid crystal display device 1 to an external apparatus via, for example, a flexible printed circuit (FPC) or the like.

The color filter substrate 3 is a glass substrate including thin films colored with red, green, and blue for respective pixels that serve as units for the liquid crystal display device 1 to form an image. The colored thin films are formed at positions corresponding to the pixel electrodes formed on the array substrate 2.

Further, polarizing films 4 are bonded to the back surface of the array substrate 2 and the front surface of the color filter substrate 3.

Figure 1B:
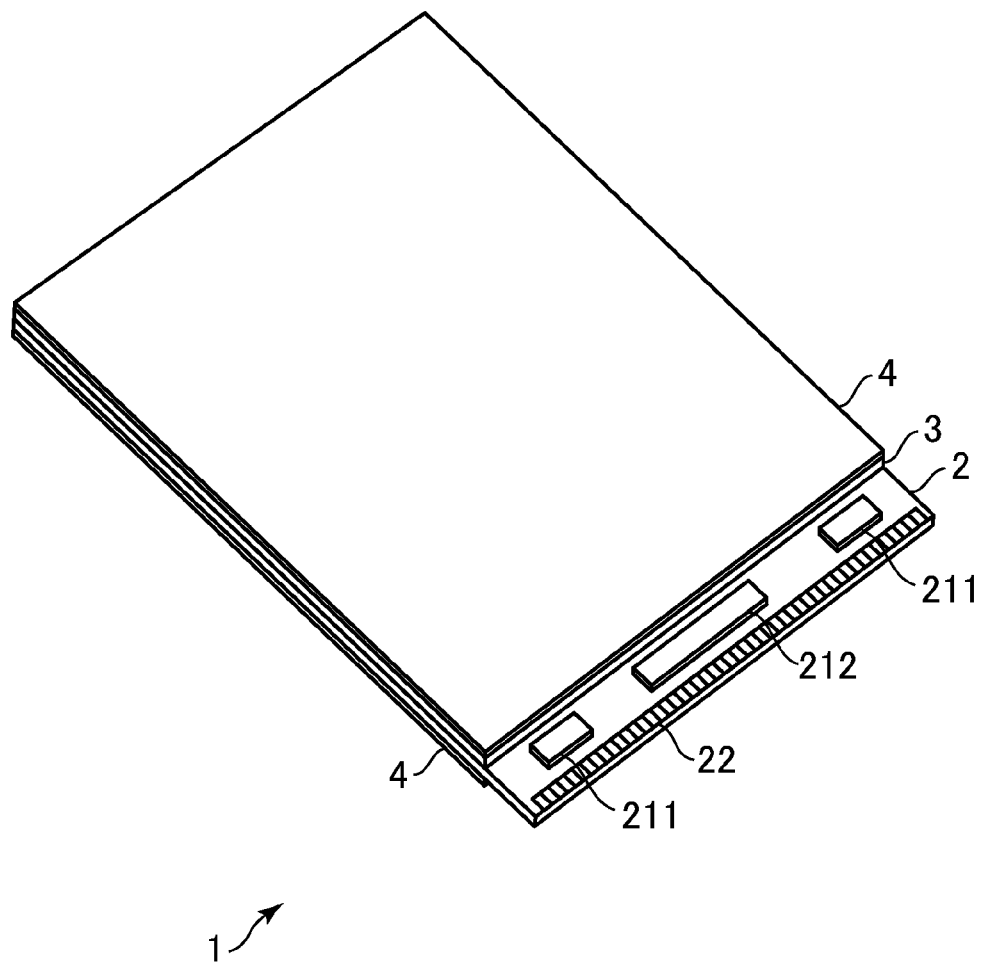
FIG. 1B is an external perspective view of a liquid crystal display device according to another embodiment of this application.

Further, as illustrated in FIG. 1B, on the exposed part of the front surface of the array substrate 2, that is, on a part formed of a protruded short side of the array substrate 2 in the illustrated example, a driver IC including a scanning signal drive circuit 211 and a driver IC including a video signal drive circuit 212 may be individually formed. In the illustrated example, in the part formed of the protruded short side of the array substrate 2, the video signal drive circuit 212 is formed at a center portion in a direction parallel to the short side, and the scanning signal drive circuits 211 are respectively formed at both end portions in the direction parallel to the short side. The scanning signal drive circuits 211 and the video signal drive circuit 212 are collected to the part formed of the protruded short side of the array substrate 2. Thus, the frame width of the long side of the array substrate 2 can be narrowed.

Note that, in the embodiment described above, the liquid crystal display device 1 is a so-called transmissive liquid crystal display device, and the array substrate 2 and the color filter substrate 3 are transparent substrates made of glass or the like. When the liquid crystal display device 1 is a reflective liquid crystal display device, the array substrate 2 and the color filter substrate 3 do not need to be transparent, and materials therefor are not limited to glass. Further, in the embodiment described above, the liquid crystal display device 1 is a full-color display device, and hence the color filter substrate 3 includes the thin films colored with red, green, and blue. However, the combination of the colors may differ. Further, the liquid crystal display device 1 may be a monochrome display device in which a thin film colored with a single color is used or the colored thin film is omitted.

Figure 2:
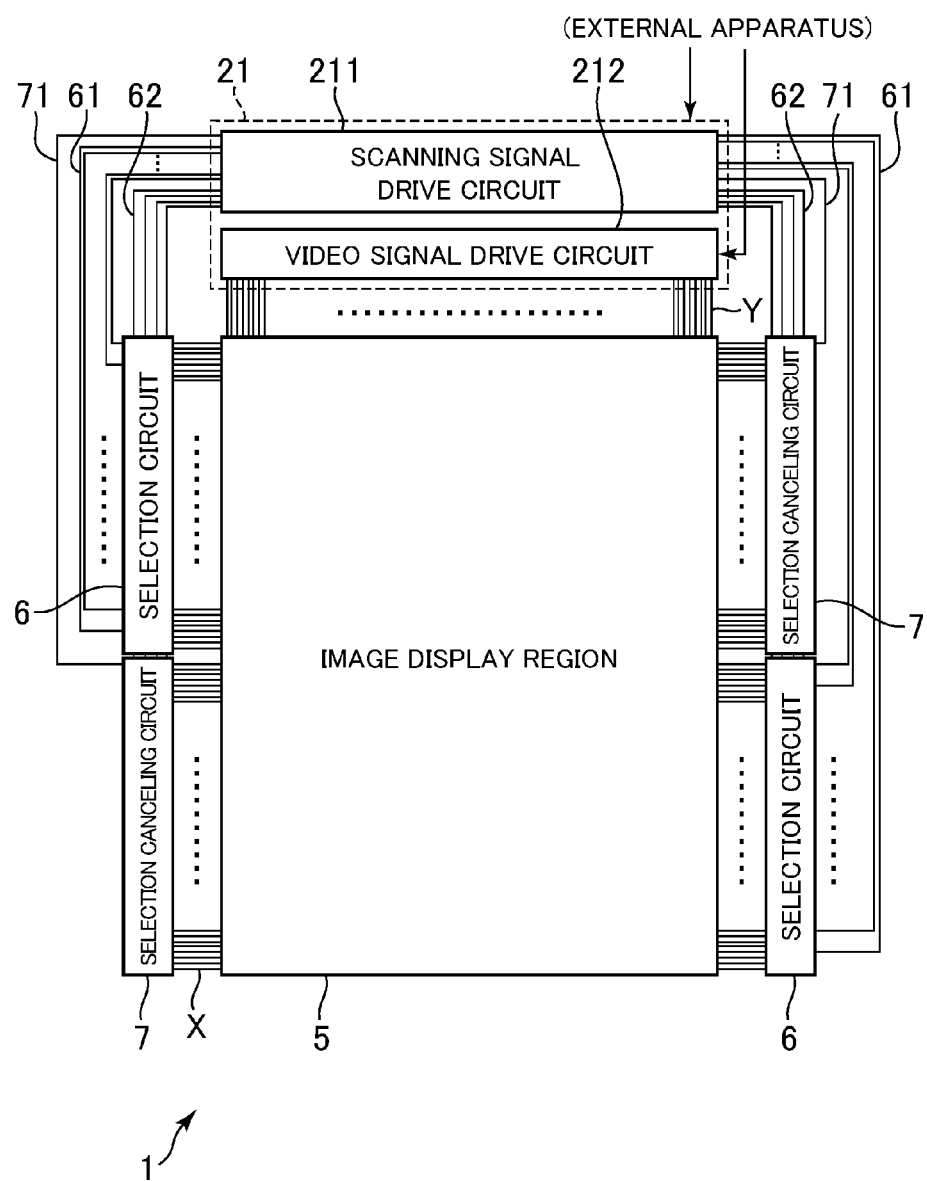
FIG. 2 is a view illustrating configurations of circuits formed on an array substrate of the liquid crystal display device according to an embodiment of this application.

FIG. 2 is a view illustrating configurations of circuits formed on the array substrate 2 of the liquid crystal display device 1 according to the embodiment of this application.

On the array substrate 2, a rectangular image display region 5 in which a large number of pixels are arranged in matrix is formed. Note that, the resolution and the horizontal and vertical lengths of the image display region 5 are determined depending on the application of the liquid crystal display device 1. The liquid crystal display device 1 exemplified in this embodiment has a vertically long shape (the horizontal length is smaller than the vertical length). This is because the liquid crystal display device 1 is assumed to be used as a display device for a personal digital assistance such as a so-called smartphone. Depending on the application, the image display region 5 may have a horizontally long shape (the horizontal length is larger than the vertical length), or a shape in which the horizontal length is the same as the vertical length.

On the array substrate 2, a plurality of scanning signal lines X and a plurality of video signal lines Y are formed so as to cross the image display region 5. The scanning signal lines X and the video signal lines Y are formed orthogonal to each other so as to section the image display region 5 in matrix. A region surrounded by two adjacent scanning signal lines X and two adjacent video signal lines Y corresponds to one pixel.

Figure 3:
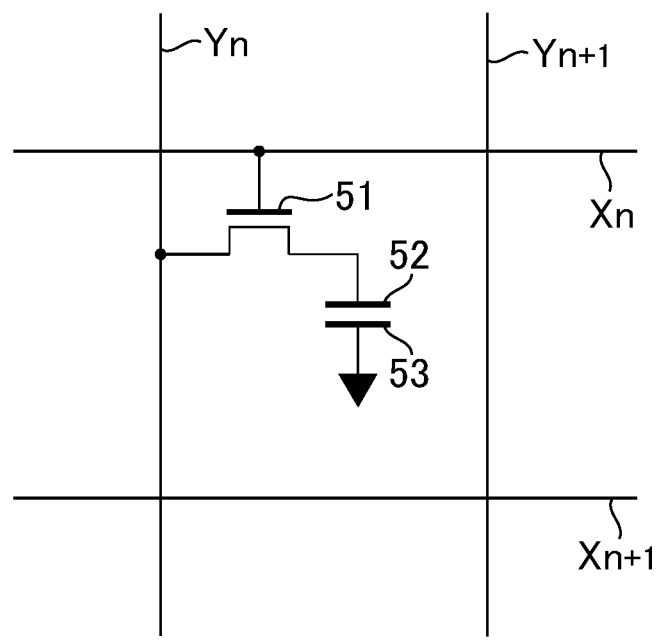
FIG. 3 is a circuit diagram illustrating one pixel formed in an image display region.

FIG. 3 is a circuit diagram illustrating one pixel formed in the image display region 5. A region illustrated in FIG. 3, which is surrounded by scanning signal lines Xn and Xn+1 and video signal lines Yn and Yn+1, corresponds to one pixel. The pixel referred to here is driven by the video signal line Yn and the scanning signal line Xn. A TFT 51 is formed in each pixel. The TFT 51 is turned on based on a scanning signal input from the scanning signal line Xn. The video signal line Yn applies a voltage (signal representing a grayscale value of each pixel) to a pixel electrode 52 of the corresponding pixel via the TFT 51 in the on state.

Further, a common electrode 53 is formed so as to correspond to the pixel electrode 52 so that a capacitor is formed via a liquid crystal layer sandwiched and sealed between the array substrate 2 and the color filter substrate 3. The common electrode 53 is electrically connected to a common potential. Therefore, based on the voltage applied to the pixel electrode 52, an electric field between the pixel electrode 52 and the common electrode 53 changes, to thereby change the alignment state of liquid crystal in the liquid crystal layer. In this manner, a polarization state of a light beam that transmits through the image display region 5 is controlled. The transmittance of the light beam that transmits through the liquid crystal display device 1 is determined based on the relationship between the polarization direction to be controlled by the liquid crystal layer and the polarization directions of the polarizing films 4 bonded to the array substrate 2 and the color filter substrate 3. Each pixel functions as an element for controlling the light transmittance. Then, the light transmittance of each pixel is controlled based on input image data to display an image. Therefore, in the liquid crystal display device 1, a region in which the pixels are formed corresponds to the image display region 5 in which an image is displayed.

Note that, the substrate on which the common electrode 53 is formed differs depending on the system for driving the liquid crystal. For example, in a case of a system called in-plane switching (IPS), the common electrode is formed on the array substrate 2. Further, for example, in a case of a system called vertical alignment (VA) or twisted nematic (TN), the common electrode is formed on the color filter substrate 3. Although the system for driving the liquid crystal is not particularly limited in this application, the IPS system is employed in this embodiment.

Referring back to FIG. 2, the driver IC21 including the scanning signal drive circuit 211 and the video signal drive circuit 212 is formed on at least one side of edges of the image display region 5, which are parallel to the scanning signal lines X, that is, on an upper side of the image display region in the illustrated example. The driver IC 21 inputs, from an external apparatus, various signals such as a power supply voltage, a ground voltage, a timing signal, and a video signal. Note that, in this embodiment, the common potential is, but not always limited to, the ground potential.

The scanning signal drive circuit 211 is connected to the scanning signal lines X by a plurality of scanning connection lines 61 via a selection circuit 6. Further, an appropriate number of selection signal lines 62 are extended from the scanning signal drive circuit 211 to be connected to the selection circuit 6. The scanning signal drive circuit 211 sequentially selects each of the scanning connection lines 61 at the timing based on the timing signal input from the external apparatus, and applies, to the selected scanning connection line 61, a voltage (hereinafter referred to as "on-voltage") for turning on the TFT 51 (see FIG. 3). Further, the same applies to the case of the selection signal lines 62. The scanning signal drive circuit 211 sequentially selects each of the selection signal lines 62 at the timing based on the timing signal input from the external apparatus, and applies the on-voltage to the selected selection signal line 62. This on-voltage applied to the selection signal line 62 corresponds to a selection signal to be described later. The selection circuit 6 sequentially applies the on-voltage to each of the scanning signal lines X based on the on-voltages applied to the scanning connection line 61 and the selection signal line 62. When a voltage is applied to the scanning signal line X, the TFTs 51 connected to the scanning signal line X are turned on.

Further, a selection canceling circuit 7 is connected to, similarly to the selection circuit 6, the scanning signal lines X and the selection signal lines 62, and is also connected to a selection canceling signal line 71. The selection canceling signal line 71 is applied with a voltage (hereinafter referred to as "off-voltage") for turning off the TFT 51 (see FIG. 3). The selection canceling circuit 7 applies the off-voltage to the scanning signal lines X at the timing based on the selection signal input from the selection signal line 62, to thereby turn off the TFTs 51 connected to the scanning signal line X. Note that, in this embodiment, the potential of the off-voltage is the common potential (that is, the ground potential).

Further, the scanning connection lines 61 are formed on at least one side (in this embodiment, both sides) of edges (in the illustrated example, right and left edges) of the image display region 5, which are parallel to the video signal lines Y. In this case, each of the scanning connection lines 61 is arranged so as to be once led out from the scanning signal drive circuit 211 to a region horizontally outside of the image display region 5, then pass an outer side of the right or left edge of the image display region 5 in parallel to the video signal lines Y, and then be connected to the selection circuit 6. The selection circuit 6 and the selection canceling circuit 7 are arranged between the image display region 5 and the scanning connection lines 61 so as to be elongated in parallel to the video signal lines Y.

Further, the video signal drive circuit 212 is connected to the video signal lines Y. The video signal drive circuit 212 applies, in synchronization with the selection of the scanning signal line X by the scanning signal drive circuit 211 and the selection circuit 6, a voltage corresponding to a video signal representing a grayscale value of each pixel to each of the TFTs 51 connected to the selected scanning signal line X.

In the above-mentioned configuration, the number of the scanning signal lines X and the number of the video signal lines Y depend on the resolution of the image display region 5. In this embodiment, when the resolution of the image display region is what is called HD 720p, there are 1,280 scanning signal lines X and 2,160 (720×3) video signal lines Y. In contrast, the number of the scanning connection lines 61 is smaller than the number of the scanning signal lines X. In this embodiment, there are 320 scanning connection lines 61, which correspond to ¼ of the number of the scanning signal lines X. Further, four selection signal lines 62 are formed on each of the right and left sides to provide a total of eight selection signal lines 62, and one selection canceling signal line 71 is formed on each of the right and left sides to provide a total of two selection canceling signal lines 71.

Although the selection circuit 6 is described in detail later, the meaning of the selection circuit 6 is briefly described now. The selection circuit 6 is interposed between the scanning connection lines 61 and the scanning signal lines X so as to selectively short-circuit a plurality of scanning signal lines X to one scanning connection line 61 based on the selection signal. In the case of this embodiment, one scanning connection line 61 is associated with four scanning signal lines X, and the selection of one of those four scanning signal lines X is determined depending on to which of those four selection signal lines 62 the on-voltage is applied. In other words, the selection circuit 6 is configured to divide the scanning signal lines X into four groups depending on with which selection signal line 62 the scanning signal line X is associated, and short-circuit, based on the selection signal for selecting any one of those groups, the scanning connection line 61 to the scanning signal lines X belonging to the corresponding group. With this, as a result of division of the scanning signal lines X into four groups, the number of the scanning connection lines 61 may be ¼ of the number of the scanning signal lines X.

Note that, the division number of the scanning signal lines X is not limited to 4, and may be an arbitrary number. In general, if the most reasonable configuration is given in a case where the scanning signal lines X are divided into n (n is a natural number of 2 or more) groups, the number of the scanning connection lines 61 is 1/n of the number of the scanning signal lines X. Further, the number of the selection signal lines 62 and the number of the selection canceling signal lines 71 are small. Therefore, the number of signal lines to be arranged in the region horizontally outside of the image display region 5, that is, a total number of the scanning connection lines 61, the selection signal lines 62, and the selection canceling signal lines 71 is significantly reduced. In view of this point, the width necessary for the region horizontally outside of the image display region 5 is particularly reduced, and hence the liquid crystal display device 1 may achieve a narrower frame.

Further, in the example illustrated in FIG. 2, the selection circuit 6 and the selection canceling circuit 7 are formed on each of both the right and left sides of the image display region 5 (that is, in an upper half region of the image display region 5 in FIG. 2, the selection circuit 6 is formed on the left side of the image display region 5, and the selection canceling circuit 7 is formed on the right side thereof, while in a lower half region of the image display region 5 in FIG. 2, the selection circuit 6 is formed on the right side of the image display region 5, and the selection canceling circuit 7 is formed on the left side thereof). The reason for this is to equalize the number of the scanning connection lines 61 to be connected to the selection circuit 6 between the right and left sides. In this example, the number of the scanning connection lines formed on each of the right and left sides is 160. This configuration is achieved to equalize the width between the right and left frames of the image display region 5. When it is unnecessary to equalize the width between the right and left frames, the selection circuits 6 may be formed only on the left side (or the right side) of the image display region 5, and the selection canceling circuits 7 may be formed only on the opposite side thereto.

Figure 4:
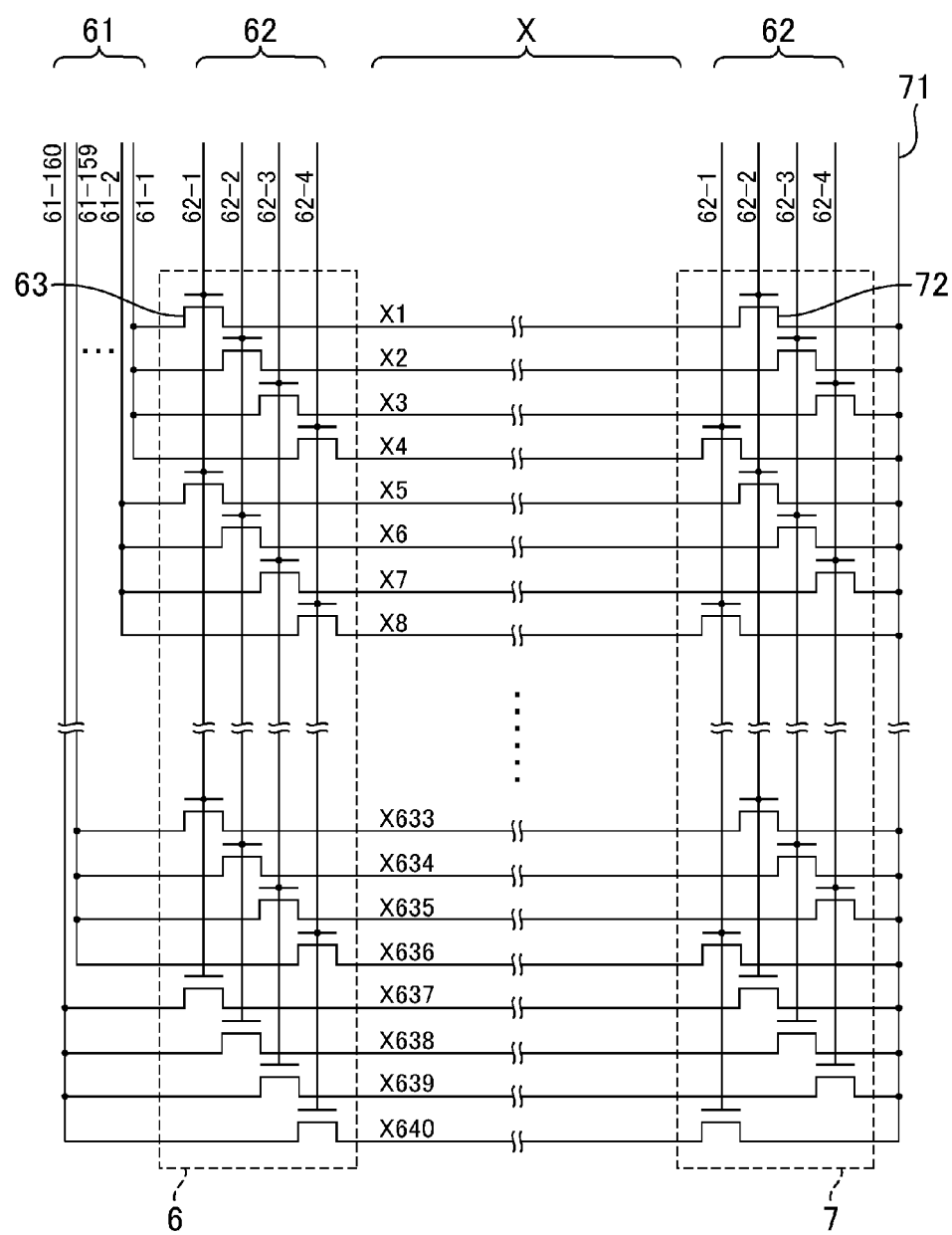
FIG. 4 is a circuit diagram of a selection circuit and a selection canceling circuit of FIG. 2.

FIG. 4 is a circuit diagram of the selection circuit 6 and the selection canceling circuit 7 of FIG. 2. FIG. 4 illustrates a region corresponding to the upper half of the image display region 5 of FIG. 2. A region corresponding to the lower half of the image display region 5 only has a mirror-reversed arrangement of the selection circuit 6 and the selection canceling circuit 7, and other configurations are the same as those of the region corresponding to the upper half. Therefore, the illustration and description of the region corresponding to the lower half are omitted.

In the center part of FIG. 4, a part of the scanning signal lines X corresponding to the upper half of the image display region 5 is illustrated. In this embodiment, the number of the scanning signal lines X is 1,280, and hence the upper half includes 640 scanning signal lines X. In FIG. 4, the scanning signal lines X are numbered as X1 to X640 in the order of scanning. Further, four selection signal lines 62 are connected to each of the selection circuit 6 and the selection canceling circuit 7. The respective selection signal lines 62 are numbered as 62-1 to 62-4. Further, the scanning connection lines 61 are connected to the selection circuit 6. The number of the scanning connection lines 61 is ¼ of the number of the scanning signal lines X in this case, and hence there are 160 scanning connection lines in FIG. 4, which are numbered as 61-1 to 61-160. Finally, the selection canceling signal line 71 is connected to the selection canceling circuit 7.

In the selection circuit 6, TFTs 63 are formed so as to correspond to the respective scanning signal lines X1 to X640. In this case, referring to the scanning connection line 61-1, four scanning signal lines X represented by X1 to X4 are connected via the respective TFTs 63 to the scanning connection line 61-1, and further, gates of the four TFTs 63 are connected to the different selection signal lines 62-1 to 62-4, respectively. With this configuration, by applying the on-voltage to any one of the selection signal lines 62-1 to 62-4, the scanning connection line 61-1 is short-circuited to corresponding one of the scanning signal lines X1 to X4. The correspondence relationship among the TFTs 63 and the selection signal lines 62 is as follows. The TFT 63 connected to the scanning signal line X1 is connected to the selection signal line 62-1, the TFT 63 connected to the scanning signal line X2 is connected to the selection signal line 62-2, the TFT 63 connected to the scanning signal line X3 is connected to the selection signal line 62-3, and the TFT 63 connected to the scanning signal line X4 is connected to the selection signal line 62-4. Then, the TFT 63 connected to the next scanning signal line X5 is connected to the selection signal line 62-1 again, and the same is repeated thereafter. As a result, the scanning connection lines 61-2 to 61-160 also have the same configuration, and as illustrated in FIG. 4, the scanning connection line 61-160 is connected to the respective scanning signal lines X637 to X640 via the four TFTs 63.

Also in the selection canceling circuit 7, similarly, TFTs 72 are formed so as to correspond to the respective scanning signal lines X1 to X640, and all of the scanning signal lines X are connected to the selection canceling signal line 71 via the TFTs 72. Gates of the TFTs 72 are each connected to corresponding one of the selection signal lines 62-1 to 62-4. The correspondence relationship among the TFTs 72 and the selection signal lines 62 differs from that in the case of the selection circuit 6. The TFT 72 connected to the scanning signal line X1 is connected to the selection signal line 62-2, the TFT 72 connected to the scanning signal line X2 is connected to the selection signal line 62-3, the TFT 72 connected to the scanning signal line X3 is connected to the selection signal line 62-4, the TFT 72 connected to the scanning signal line X4 is connected to the selection signal line 62-1, and the same is repeated thereafter.

In the configuration described above, the scanning signal lines X1 to X640 are divided into four groups associated with the selection signal lines 62-1 to 62-4 via the TFTs 63. Then, by inputting the selection signal to the selection signal line 62, that is, by applying the on-voltage to any one of the selection signal lines 62-1 to 62-4, corresponding one group is selected, and the scanning signal line X belonging to the group is connected to the scanning connection line 61. Further, arbitrary one of the scanning connection lines 61 is connected to the scanning signal lines X respectively belonging to different groups via the respective TFTs 63.

Figure 5:
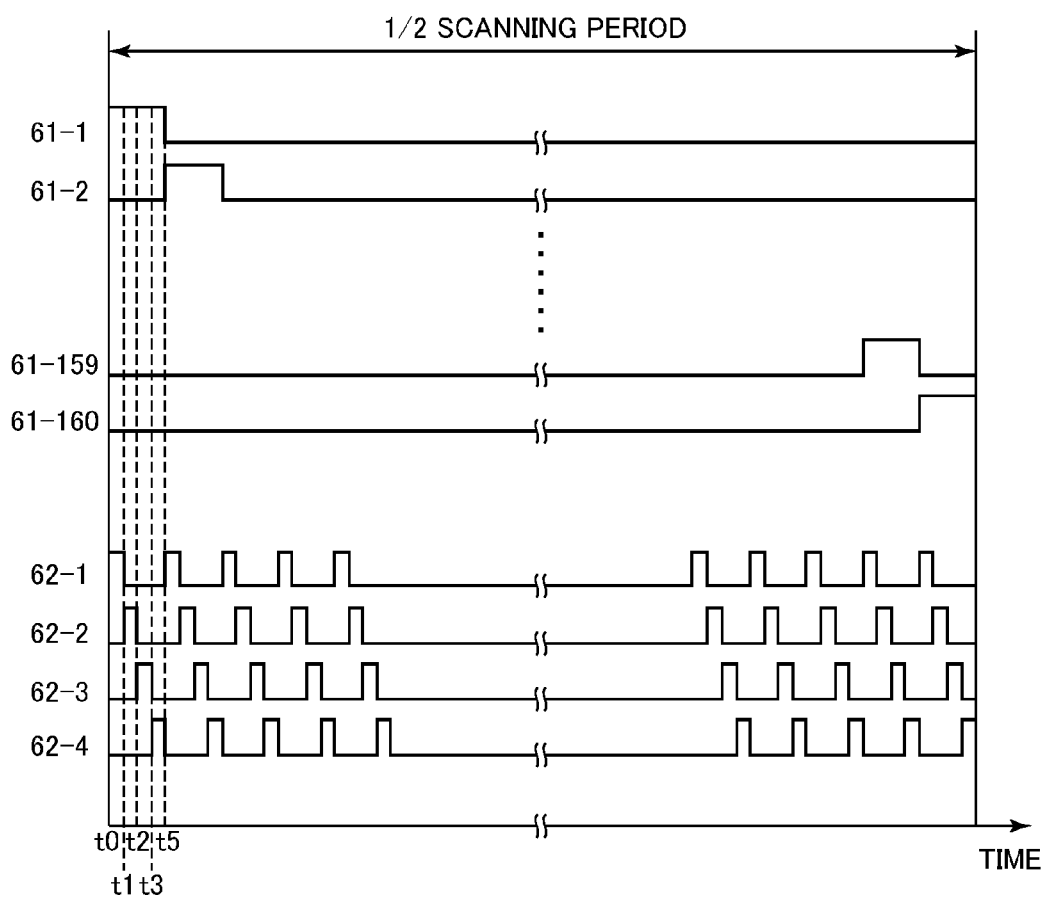
FIG. 5 is a time chart illustrating signals to be applied to scanning connection lines and selection signal lines illustrated in FIG. 4.

FIG. 5 is a time chart illustrating signals to be applied to the scanning connection lines 61 and the selection signal lines 62 illustrated in FIG. 4. FIG. 5 illustrates a ½ scanning period as a period for scanning the scanning signal lines X in the upper half of the image display region 5.

Description is given referring also to FIG. 4. First, at time t0, on-voltages are applied to the scanning connection line 61-1 and the selection signal line 62-1, and other scanning connection lines 16 and selection signal lines 62 are set to the off-voltage. As a result, on the selection circuit 6 side, the TFTs 63 connected to the scanning signal lines X1, X5, . . . , X633, and X637 are turned on. Among them, however, the scanning signal line connected to the scanning connection line 61-1 is only the scanning signal line X1, and hence the on-voltage is input to the scanning signal line X1, and the TFTs 51 (see FIG. 3) in the pixels connected to the scanning signal line X1 are turned on. At this time, on the selection canceling circuit 7 side, the TFT 72 connected to the scanning signal line X1 is turned off.

Subsequently, at time t1, the voltage applied to the scanning connection line 61-1 is maintained to the on-voltage. The off-voltage is applied to the selection signal line 62-1, and the on-voltage is applied to the selection signal line 62-2. As a result, the on-voltage is input to the scanning signal line X2. At this time, on the selection canceling circuit 7 side, the TFT 72 connected to the scanning signal line X1 is turned on, and hence the scanning signal line X1 is short-circuited to the selection canceling signal line 71. The voltage of the selection canceling signal line is the off-voltage, and hence the TFTs 51 (see FIG. 3) of the pixels connected to the scanning signal line X1 are turned off. Similarly, at time t2, the on-voltage is applied to the selection signal line 62-3, and at time t3, the on-voltage is sequentially applied to the selection signal line 62-4. Thus, the on-voltage is sequentially applied to each of the scanning signal lines X3 and X4. Simultaneously, the scanning signal lines X2 and X3 are sequentially set to the off-voltage.

Further, at time t5, the off-voltage is applied to the scanning connection line 61-1, the on-voltage is applied to the scanning connection line 61-2, and the on-voltage is applied again to the selection signal line 62-1. With this, the on-voltage is applied to the scanning signal line X5, and the scanning signal line X4 is set to the off-voltage. This operation is repeated similarly up to the scanning connection line 61-160 so that the on-voltage is sequentially applied to each of the scanning signal lines X1 to X640 for scanning.

The above-mentioned operation is employed when the scanning signal lines X are divided into four groups. If this operation is generalized to describe a case where the scanning signal lines X are divided into n groups, when a signal for selecting an m-th group is given as the selection signal, in the selection circuit 6, the scanning connection line 61 is short-circuited to the scanning signal line X belonging to the m-th group, and in selection canceling circuit 7, the selection canceling signal line 71 is short-circuited to the scanning signal line X belonging to a (m−1) th group. Note that, when m is 1, m−1 becomes 0. In this case, the scanning signal line X belonging to the n-th group is selected.

Figure 6:
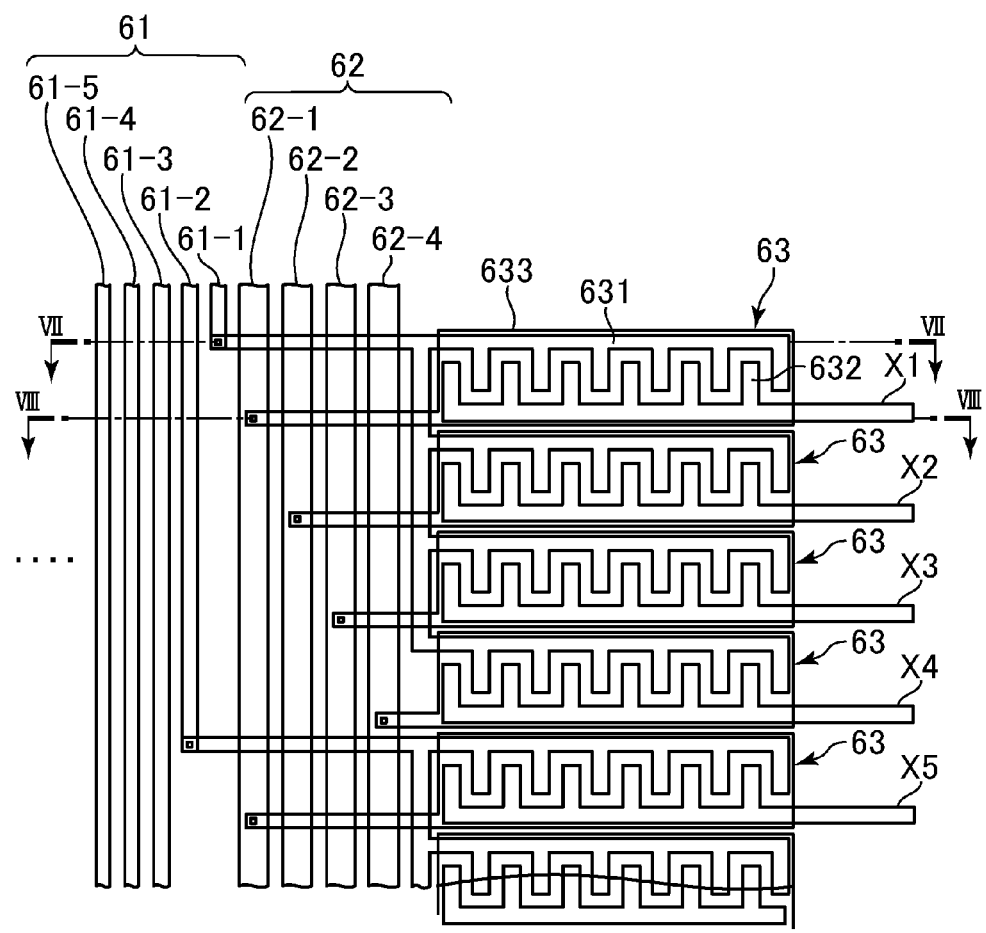
FIG. 6 is an enlarged plan view of a part of the selection circuit formed on the array substrate and a peripheral portion thereof.

FIG. 6 is an enlarged plan view of a part of the selection circuit 6 formed on the array substrate 2 and a peripheral portion thereof. The respective members illustrated in FIG. 6 are formed with use of a known semiconductor manufacturing process by laminating, on a surface of the array substrate 2, a gate electrode 633, a gate insulating film 635, a semiconductor layer 634, a source electrode 631, a drain electrode 632, and the like, which are arranged so as to overlap with each other as appropriate. In FIG. 6, in order to clarify the positional relationship thereamong, an outer shape is illustrated also in the overlapped part.

The part illustrated in FIG. 6 is an upper portion of the selection circuit 6 of FIG. 4, in which the scanning signal lines X1 to X5 are partially illustrated. A left end part of each of the scanning signal lines X1 to X5 is formed into a comb shape to form the drain electrode 632 (or the gate electrode) of the TFT 63. Then, the source electrode 631 (or the drain electrode) having a comb shape is arranged so as to be alternately combined with the drain electrode 632 (that is, in an interleave shape). The gate electrode 633 is formed in a layer under a region in which the source electrode 631 and the drain electrode 632 are arranged. Note that, the source electrode 631 and the drain electrode 632 are each formed into a comb shape and arranged so as to be alternately combined with each other because the length of a part in which the source electrode 631 and the drain electrode 632 face each other may be increased to reduce the resistance between both the electrodes.

Further, the source electrodes 631 of the TFTs 63 connected to the scanning signal lines X1 to X4 are collected into one line to be connected to the scanning connection line 61-1 via a through hole. On the other hand, the gate electrode 633 of the TFT 63 connected to the scanning signal line X1 is connected to the selection signal line 62-1 via a through hole, and the gate electrodes 633 of the TFTs 63 connected to the scanning signal lines X2 to X4 are individually connected to the respective selection signal lines 62-2 to 62-4 via the through holes. The structures of the scanning signal line X5 and subsequent scanning signal lines are similar to the above except that the source electrode 631 of the TFT 63 is sequentially connected to the scanning connection line 61-2 or the scanning connection line subsequent thereto.

Figure 7:
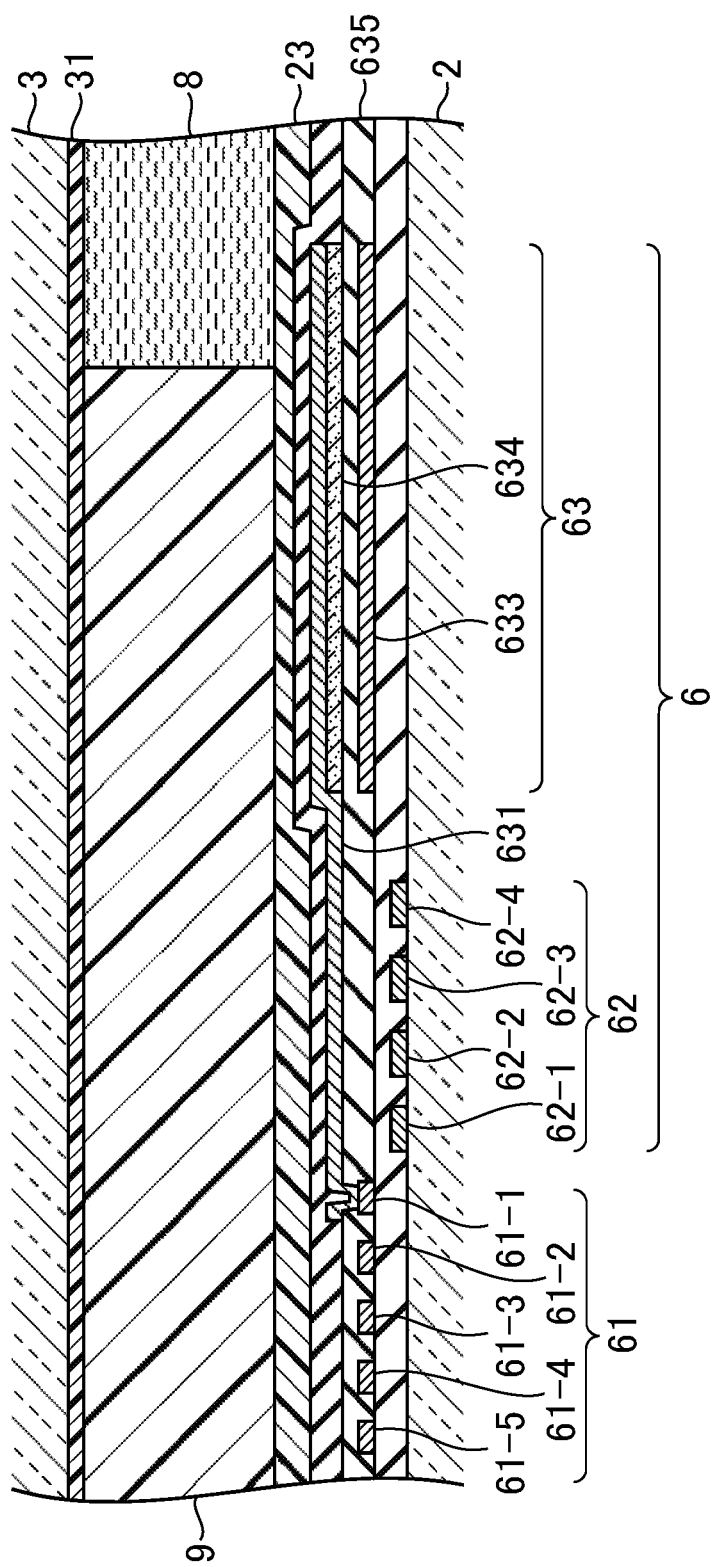
FIG. 7 is a partial sectional view of the liquid crystal display device taken along the line VII-VII of FIG. 6.

FIG. 7 is a partial sectional view of the liquid crystal display device 1 taken along the line VII-VII of FIG. 6. On the front surface of the array substrate 2, the selection signal lines 62, the scanning connection lines 61, the gate electrode 633, the semiconductor layer 634, and the source electrode 631 are arranged through intermediation of insulating layers as appropriate. Further, the insulating layer between the gate electrode 633 and the semiconductor layer 634 is particularly called the gate insulating film 635. The sectional view of FIG. 7 illustrates a state in which the scanning connection line 61-1 is connected to the source electrode 631 via the through hole. Further, on the front surface of the array substrate 2, a functional film 23 such as a protective insulating film, a planarization film, and an alignment film is formed as appropriate. A liquid crystal layer 8 is held between the functional film 23 and a functional film 31 formed on a back surface of the color filter substrate 3 arranged so as to oppose the array substrate 2. Further, a sealing material 9 for sealing the liquid crystal layer 8 and causing the array substrate 2 to adhere to the color filter substrate 3 is formed at a position overlapping with the scanning connection lines 61 and the selection circuit 6 in plan view as illustrated in FIG. 7. With this structure, a narrower frame can be achieved while effectively utilizing the scanning connection lines 61 and the selection circuit 6.

Figure 8:
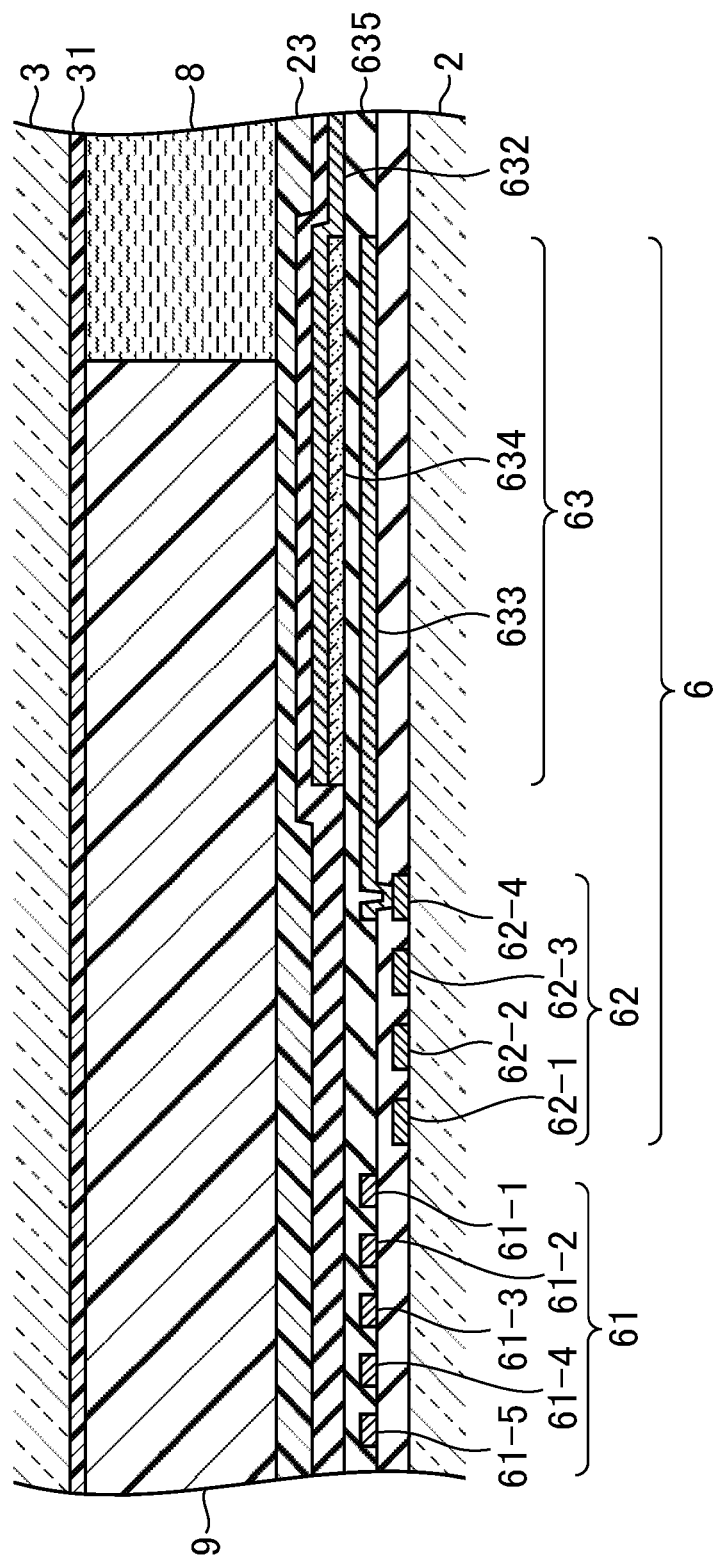
FIG. 8 is a partial sectional view of the liquid crystal display device taken along the line VIII-VIII of FIG. 6.

FIG. 8 is a partial sectional view of the liquid crystal display device 1 taken along the line VIII-VIII of FIG. 6. The sectional view of FIG. 8 illustrates a state in which the selection signal line 62-4 is connected to the gate electrode 633 via the through hole.

By the way, in the embodiment illustrated in FIGS. 7 and 8, the scanning connection lines 61 are formed in the same layer, and the adjacent scanning connection lines 61 are arranged at necessary intervals based on the process rule. However, by forming the scanning connection lines 61 in different layers, the scanning connection lines 61 can be arranged more densely without changing the process rule.

Figure 9:
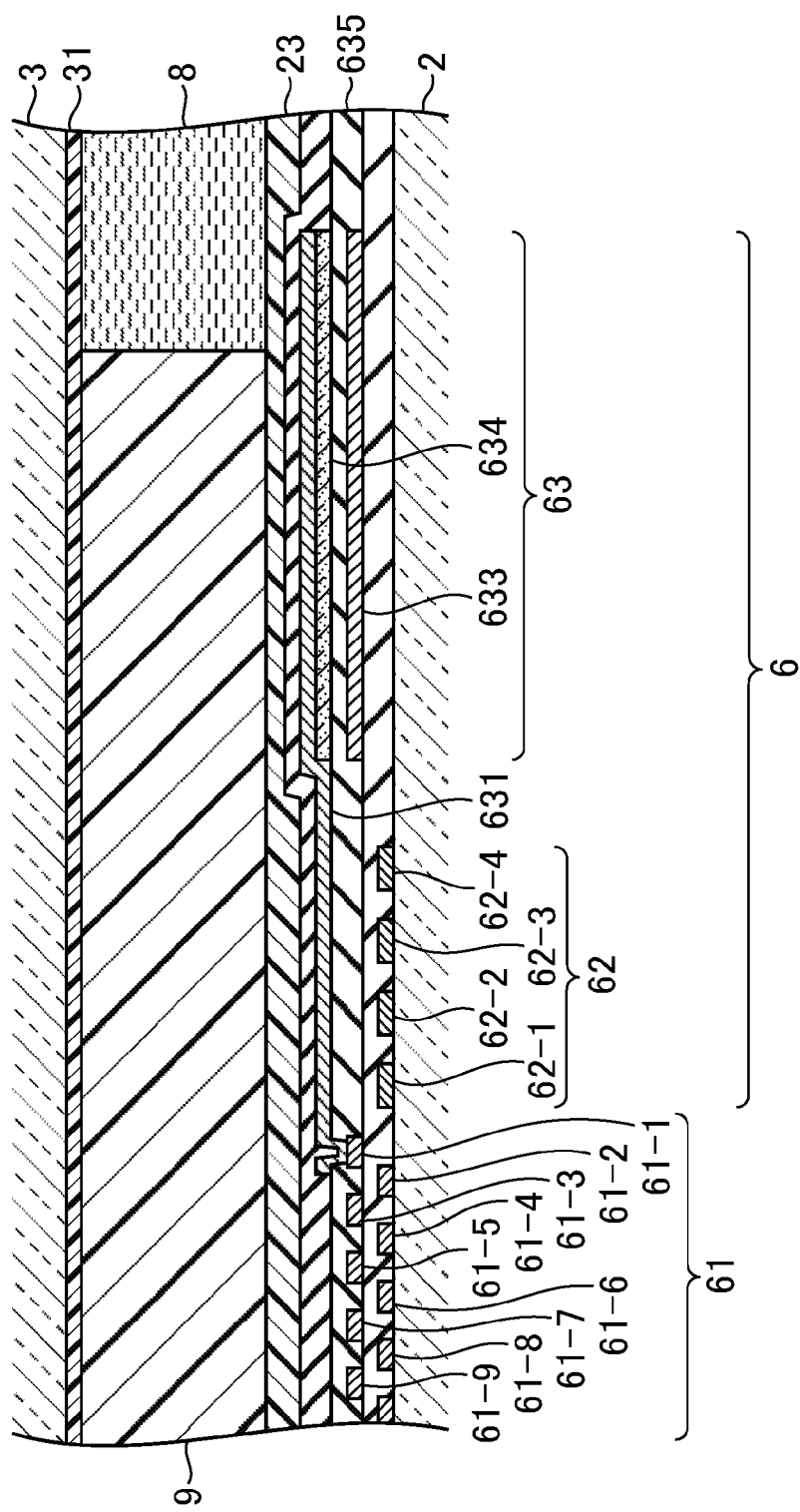
FIG. 9 is a partial sectional view of a liquid crystal display device according to a modified example in which the scanning connection lines are arranged more densely.

FIG. 9 is a partial sectional view of the liquid crystal display device 1 according to a modified example in which the scanning connection lines 61 are arranged more densely. FIG. 9 illustrates a cross section at the same position as FIG. 7. In this modified example, the plurality of scanning connection lines 61 are arranged in different layers alternately. In plan view, at a gap between the adjacent scanning connection lines 61 in a certain layer (for example, the scanning connection lines 61-1 and 61-3), the scanning connection line 61 in another layer (in the exemplified case, the scanning connection line 61-2) is arranged. With this structure, a narrower frame is achieved by effectively using a limited region and arranging the scanning connection lines 61 more densely.

Figure 10:
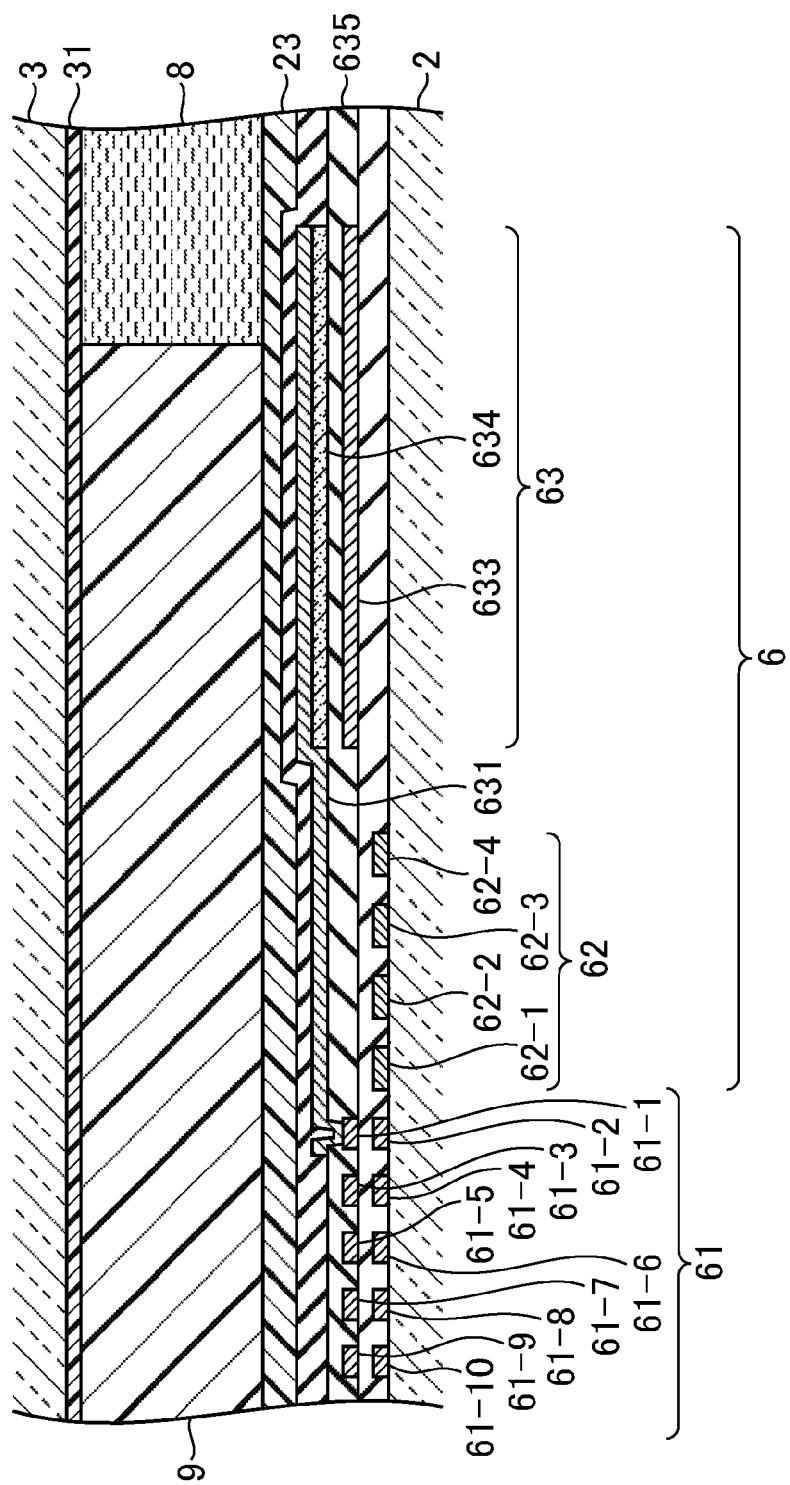
FIG. 10 is a partial sectional view of a liquid crystal display device according to another modified example in which the scanning connection lines are arranged more densely.

FIG. 10 is a partial sectional view of the liquid crystal display device 1 according to another modified example in which the scanning connection lines 61 are arranged more densely. Also FIG. 10 illustrates a cross section at the same position as FIG. 7. In this modified example, the plurality of scanning connection lines 61 are arranged in different layers alternately. In plan view, in order to overlap with the scanning connection line 61 arranged in a certain layer (for example, the scanning connection line 61-1), the scanning connection line 61 arranged in another layer (in the exemplified case, the scanning connection line 61-2) is arranged. In this structure, a narrower frame is achieved by effectively using a limited region and arranging the scanning connection lines 61 more densely.

Note that, it is preferred that the scanning connection line 61 and the selection signal line 62 be made of a material having large electric conductivity so as to reduce the resistances thereof. In this embodiment and the modified examples thereof, a metal such as copper and aluminum is used for the scanning connection line 61 and the selection signal line 62. In this case, when the scanning connection lines 61 are arranged as in the modified example of FIG. 9, in a region in which the scanning connection lines 61 are arranged, a light beam from the array substrate 2 side is blocked by the light-blocking scanning connection lines 61 to inhibit light transmission to the color filter substrate 3 side. In contrast, when the scanning connection lines 61 are arranged as in the modified example of FIG. 10, in the region in which the scanning connection lines 61 are arranged, there is a gap between the adjacent scanning connection lines 61. Therefore, a part of the light beam from the array substrate 2 side is blocked by the light-blocking scanning connection lines 61, but the remaining part of the light beam transmits to the color filter substrate 3 side. With use of this fact, for example, a photocurable resin such as an ultraviolet curable resin may be used for the sealing material 9. By radiating an appropriate light beam such as ultraviolet rays from the array substrate 2 side, the sealing material 9 can be cured.

Figure 11:
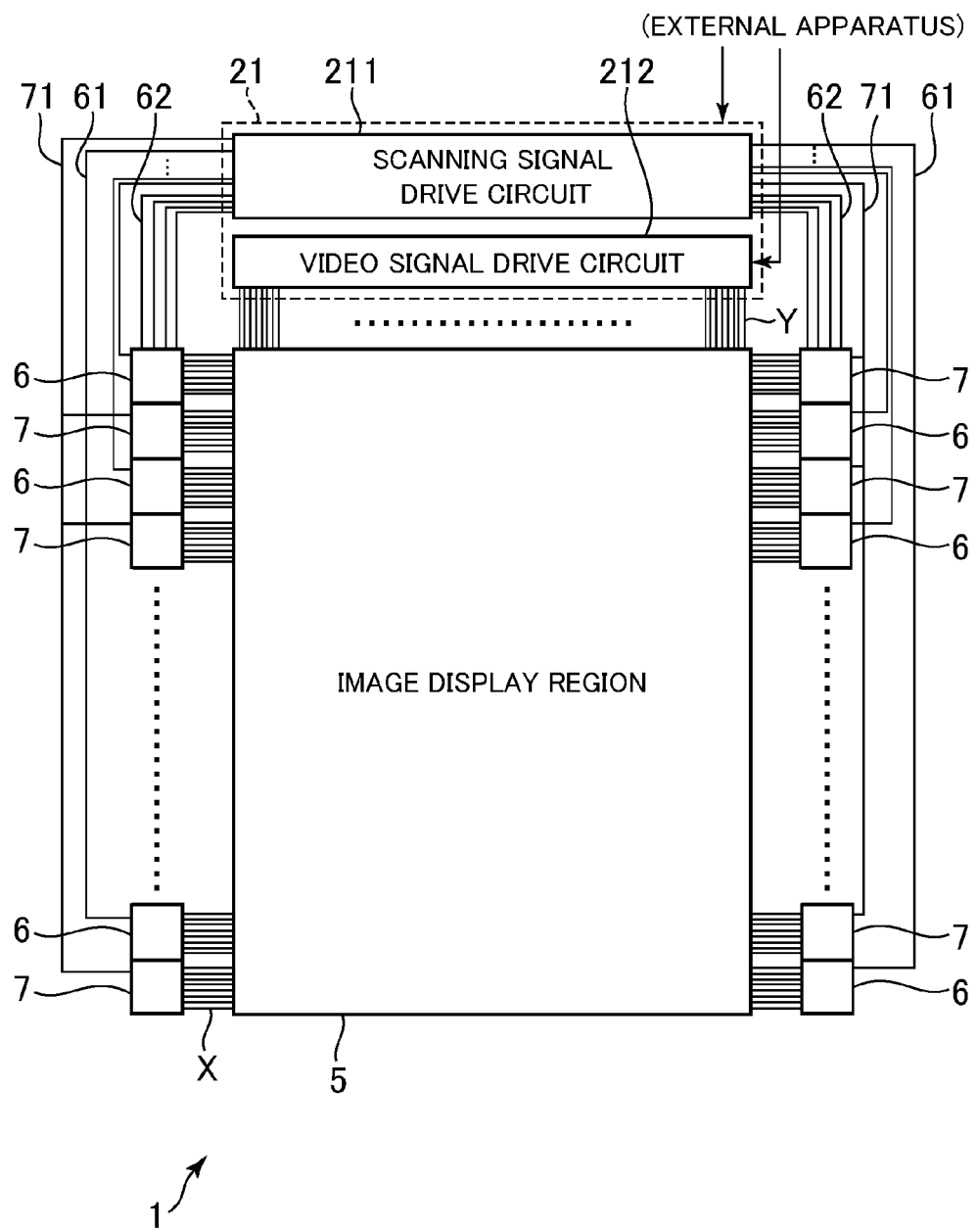
FIG. 11 is a view illustrating configurations of circuits formed on an array substrate of a liquid crystal display device according to another embodiment of this application.
Figure 12:
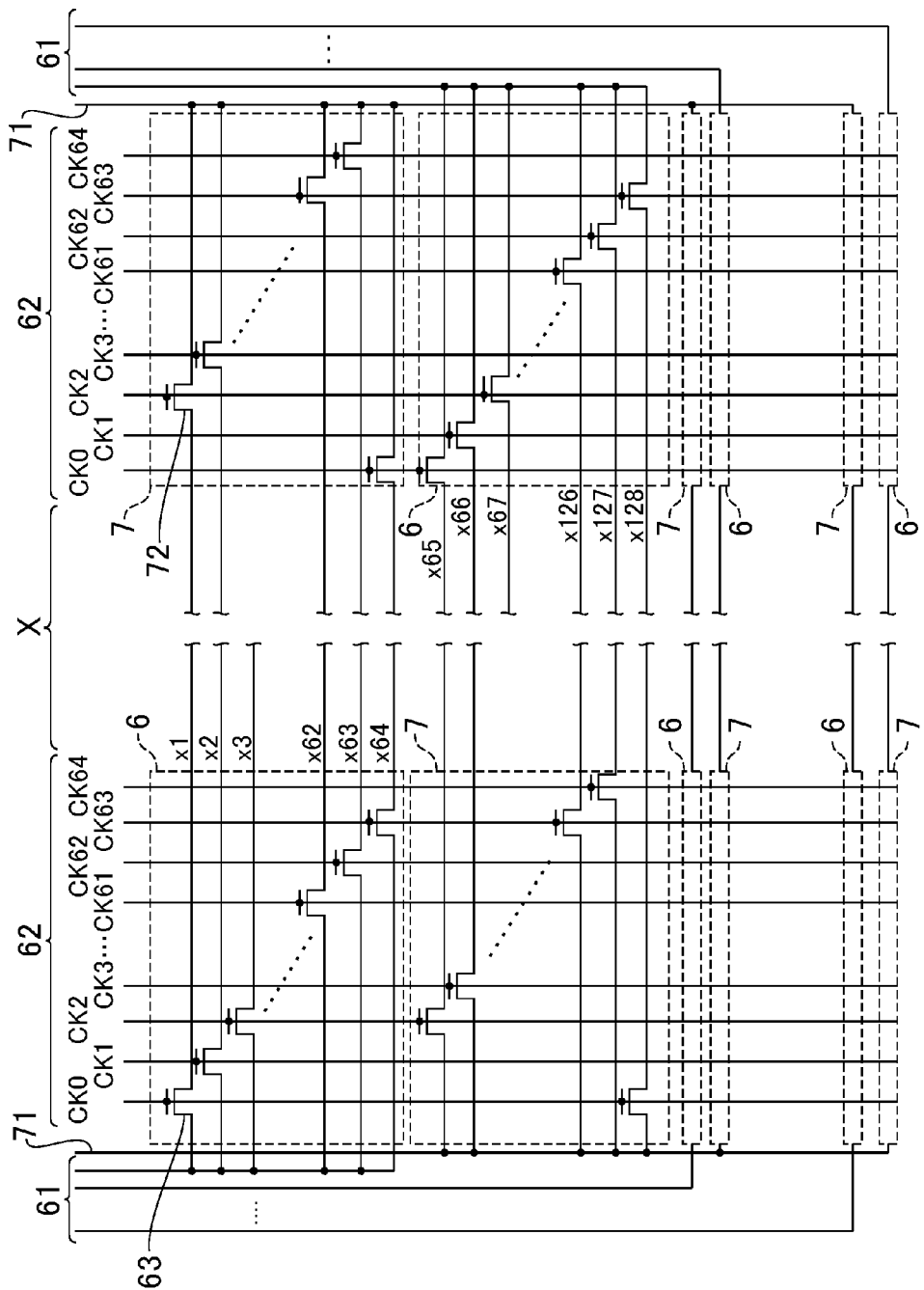
FIG. 12 is a circuit diagram of selection circuits and selection canceling circuits of FIG. 11.
Figure 13:
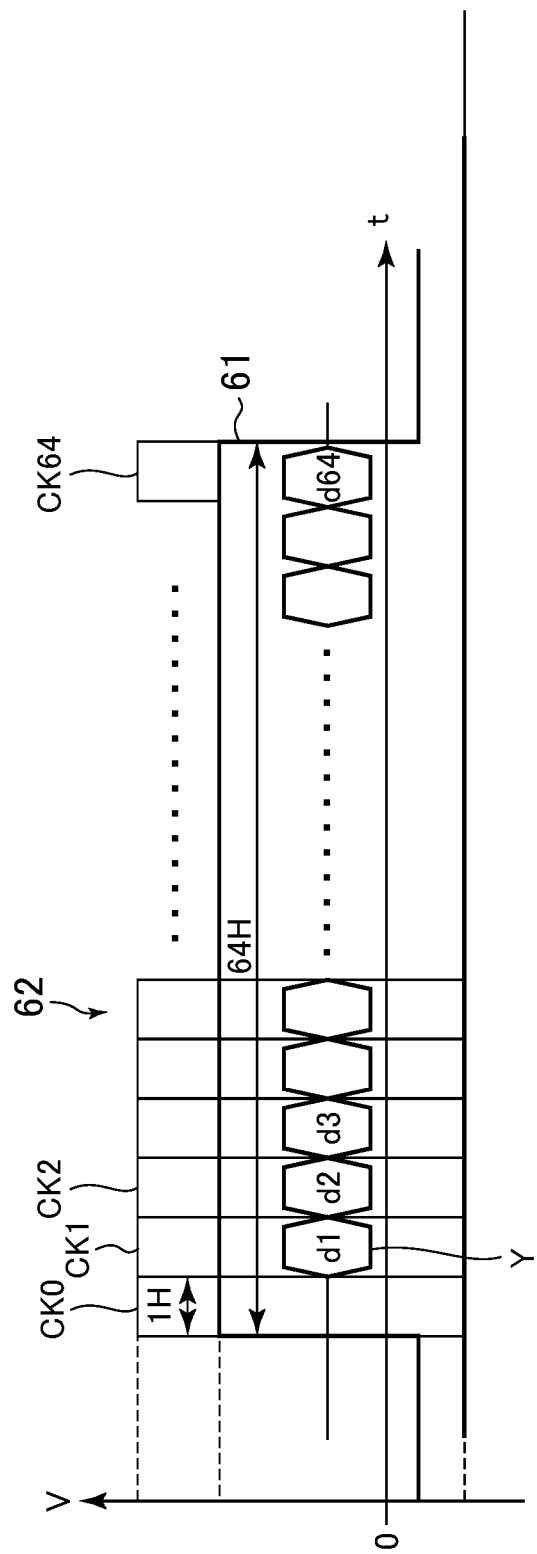
FIG. 13 is a time chart illustrating signals to be applied to the scanning connection line and the selection signal lines illustrated in FIG. 12.

FIG. 11 is a view illustrating configurations of circuits formed on the array substrate 2 of the liquid crystal display device 1 according to another embodiment of this application. FIG. 12 is a circuit diagram of the selection circuit 6 and the selection canceling circuit 7 of FIG. 11. FIG. 13 is a time chart illustrating signals to be applied to the scanning connection line 61 and the selection signal lines 62 illustrated in FIG. 12.

As illustrated in FIGS. 11 and 12, in the liquid crystal display device 1 according to this embodiment, on both sides of edges (in the illustrated example, right and left edges) of the image display region 5, which are parallel to the video signal lines Y, the plurality of selection circuits 6 and the plurality of selection canceling circuits 7 are alternately arranged. The plurality of selection circuits 6 and the plurality of selection canceling circuits 7 are arranged so as to oppose each other.

In this embodiment, 15 scanning connection lines 61 are formed on each of the right and left sides, 65 selection signal lines 62 are formed on each of the right and left sides, and one selection canceling signal line 71 is formed on each of the right and left sides. CK0 to CK64 of the selection signal lines 62 represent the order of the application of the on-voltage. Further, 64 TFTs 63 are arranged in each block of the selection circuit 6, and 64 scanning signal lines X are associated with one scanning connection line 61. Further, 64 TFTs 72 are arranged in each block of the selection canceling circuit 7.

Note that, the number of the selection signal lines 62 is larger by 1 than the number of the TFTs 63 included in each block of the selection circuit 6 (that is, the number of the scanning signal lines X associated with one scanning connection line 61) and the number of the TFTs 72 included in each block of the selection canceling circuit 7 for the reason described below.

As illustrated in FIG. 12, in the selection circuit 6, the TFT 63 connected to the scanning signal line X1 is connected to the selection signal line 62 represented by CK0, the TFT 63 connected to the scanning signal line X2 is connected to the selection signal line 62 represented by CK1, the TFT 63 connected to the scanning signal line X3 is connected to the selection signal line 62 represented by CK2, the TFT 63 connected to the scanning signal line X62 is connected to the selection signal line 62 represented by CK61, the TFT 63 connected to the scanning signal line X63 is connected to the selection signal line 62 represented by CK62, and the TFT 63 connected to the scanning signal line X64 is connected to the selection signal line 62 represented by CK63. Then, the TFT 63 connected to the next scanning signal line X65 is connected to the selection signal line 62 represented by CK0 again, and the same is repeated thereafter. That is, in the selection circuit 6, no TFT 63 is connected to the selection signal line 62 represented by CK64.

On the other hand, in the selection canceling circuit 7, the TFT 72 connected to the scanning signal line X1 is connected to the selection signal line 62 represented by CK2, the TFT 72 connected to the scanning signal line X2 is connected to the selection signal line 62 represented by CK3, the TFT 72 connected to the scanning signal line X62 is connected to the selection signal line 62 represented by CK63, the TFT 72 connected to the scanning signal line X63 is connected to the selection signal line 62 represented by CK64, and the TFT 72 connected to the scanning signal line X64 is connected to the selection signal line 62 represented by CK0. Then, the TFT 72 connected to the next scanning signal line X65 is connected to the selection signal line 62 represented by CK2 again, and the same is repeated thereafter. That is, in the selection canceling circuit 7, no TFT 72 is connected to the selection signal line 62 represented by CK1.

FIG. 13 is a time chart illustrating a relationship among the signal to be applied to the scanning connection line 61, the signals to be applied to the selection signal lines 62, and the signals to be applied to the video signal lines Y. The horizontal axis represents time, and the vertical axis represents voltage. FIG. 13 illustrates a period in which the on-voltage is applied to one scanning connection line 61, that is, a period in which all of the scanning signal lines X corresponding to one scanning connection line 61 are scanned.

In this embodiment, there are 65 selection signal lines 62, and the on-voltage is sequentially applied to each of the selection signal lines 62 represented by CK0 to CK64. When a period in which the on-voltage is applied to each of the selection signal lines 62 represented by CK0 to CK64 is 1H, a period in which the on-voltage is applied to the scanning connection line 61 is 65H.

Further, the TFTs 51 (see FIG. 3) of the respective pixels connected to the 64 scanning signal lines X corresponding to the scanning connection line 61 are sequentially applied with voltages d1 to d64 corresponding to grayscale values via the video signal lines Y. A period in which each of the voltages d1 to d64 is applied is 1H, and a total period in which the voltages d1 to d64 are applied is 64H.

The timing to start application of the on-voltage to the scanning connection line 61 and the timing to start application of the on-voltage to the selection signal line 62 represented by CK0 are earlier by 1H than the timing to start application of the voltage d1 to the video signal line Y. Therefore, the on-voltages to be applied to the selection signal lines 62 represented by CK1 to CK64 and the voltages d1 to d64 to be applied to the video signal lines Y are arrayed so that the numbers thereof match with each other.

The scanning signal line X1 is described referring also to FIG. 12. First, when the on-voltage is applied to the selection signal line 62 represented by CK0, in the selection circuit 6, the TFT 63 connected to the scanning signal line X1 is turned on. As a result, the TFTs 51 (see FIG. 3) in the pixels connected to the scanning signal line X1 are turned on. Next, while the on-voltage is applied to the selection signal line 62 represented by CK1, the voltage d1 is applied to the TFT 51 via the video signal line Y. After that, when the on-voltage is applied to the selection signal line 62 represented by CK2, in the selection canceling circuit 7, the TFT 72 connected to the scanning signal line X1 is turned on. As a result, the scanning signal line X1 is short-circuited to the selection canceling signal line 71.

The operation is similar in the scanning signal line X2 and scanning signal lines subsequent thereto. The scanning signal line X2 is described. First, when the on-voltage is applied to the selection signal line 62 represented by CK1, in the selection circuit 6, the TFT 63 connected to the scanning signal line X2 is turned on. As a result, the TFTs 51 in the pixels connected to the scanning signal line X2 are turned on. Next, while the on-voltage is applied to the selection signal line 62 represented by CK2, the voltage d2 is applied to the TFT 51 via the video signal line Y. After that, when the on-voltage is applied to the selection signal line 62 represented by CK3, in the selection canceling circuit 7, the TFT 72 connected to the scanning signal line X2 is turned on. As a result, the scanning signal line X2 is short-circuited to the selection canceling signal line 71.

Further, the scanning signal line X64 is described. First, when the on-voltage is applied to the selection signal line 62 represented by CK63, in the selection circuit 6, the TFT 63 connected to the scanning signal line X64 is turned on. As a result, the TFTs 51 in the pixels connected to the scanning signal line X64 are turned on. Next, while the on-voltage is applied to the selection signal line 62 represented by CK64, the voltage d64 is applied to the TFT 51 via the video signal line Y. After that, when the on-voltage is applied to the selection signal line 62 represented by CK0, in the selection canceling circuit 7, the TFT 72 connected to the scanning signal line X64 is turned on. As a result, the scanning signal line X64 is short-circuited to the selection canceling signal line 71.

In general, the timing at which the TFT 63 connected to the scanning signal line Xn is turned on in the selection circuit 6 and the TFT 51 in the pixel connected to the scanning signal line Xn is turned on is earlier by 1H than the timing at which the voltage do is applied to the TFT 51 via the video signal line Y. That is, a period in which the TFT 51 is turned on is 2H, which is twice of the period in the above-mentioned embodiment illustrated in FIG. 4. With this, even when the period (1H) in which the on-voltage is applied to each of the selection signal lines 62 is reduced along with the increase in resolution of the image display region 5, it is possible to sufficiently secure the pixel charging time period.

Figure 14:
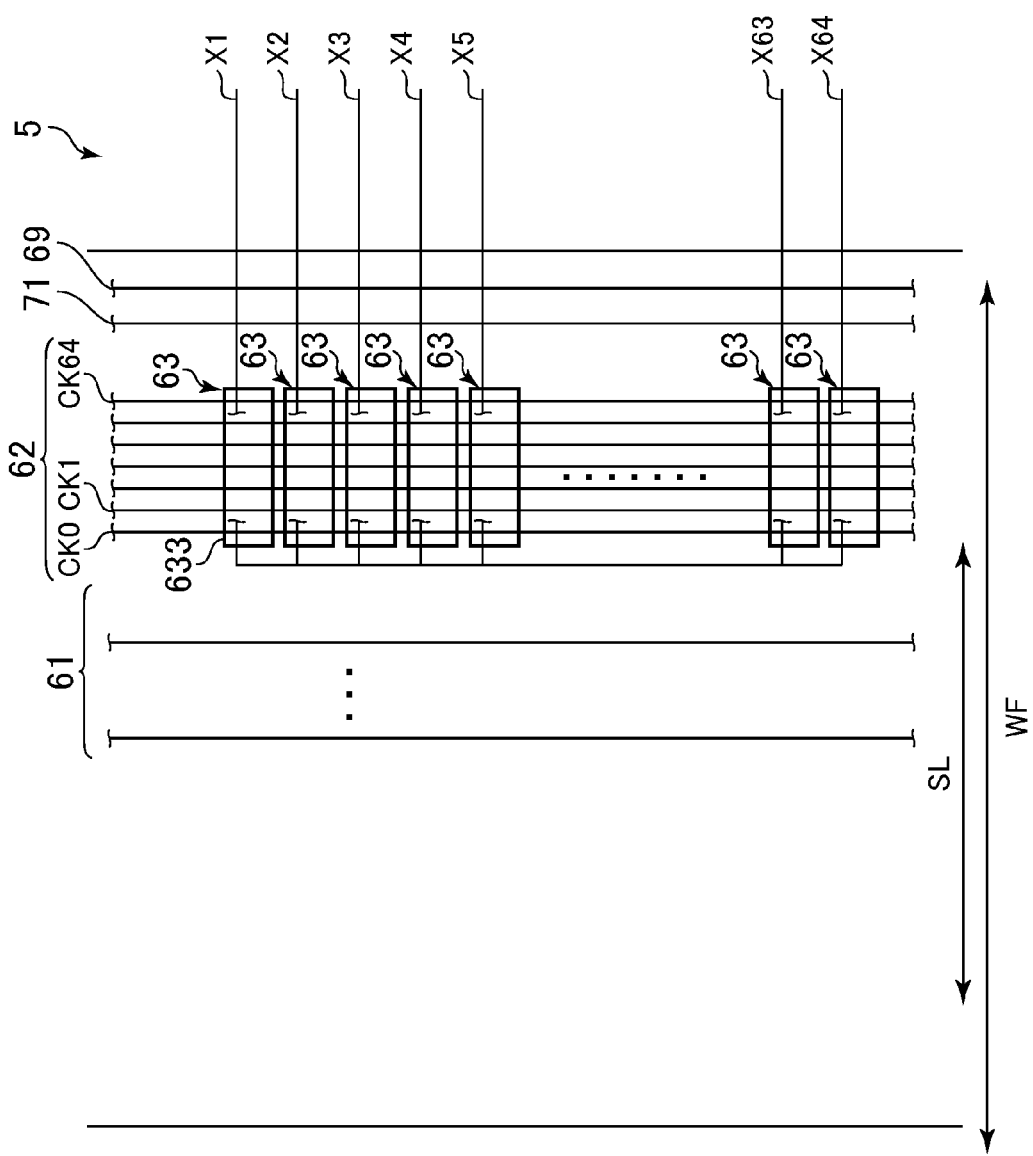
FIG. 14 is a plan view schematically illustrating a part of the selection circuit formed on the array substrate and a peripheral portion thereof.
Figure 15:
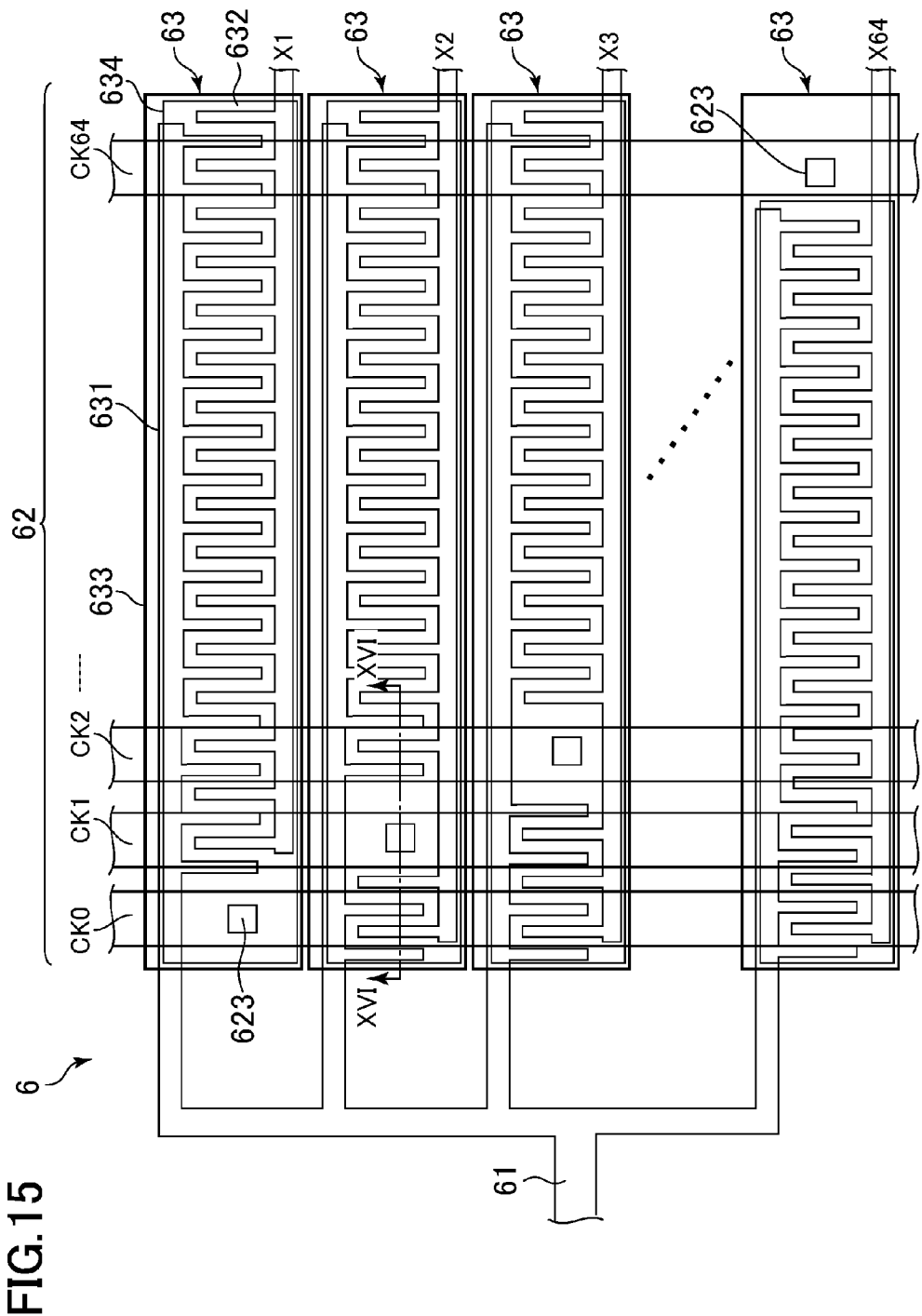
FIG. 15 is an enlarged view of a main part of FIG. 14.
Figure 16:
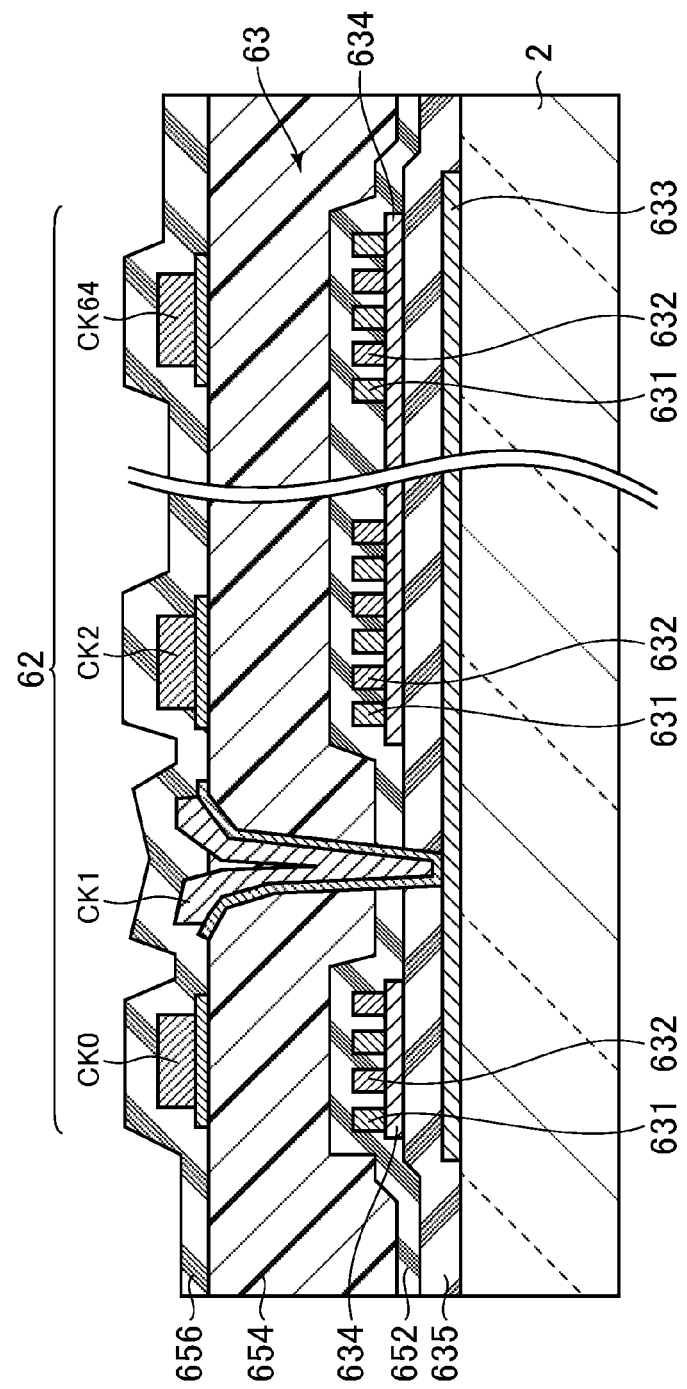
FIG. 16 is a partial sectional view of the liquid crystal display device taken along the line XVI-XVI of FIG. 15.

FIG. 14 is a plan view schematically illustrating a part of the selection circuit 6 formed on the array substrate 2 and a peripheral portion thereof. FIG. 15 is an enlarged view of a main part of FIG. 14. FIG. 16 is a partial sectional view taken along the line XVI-XVI of FIG. 15. In FIG. 14, WF represents a frame region, and SL represents a sealing region.

In this embodiment, the selection circuit 6 and the selection signal lines 62 overlap with each other in plan view. Specifically, the plurality of selection signal lines 62 extending in a direction parallel to the video signal lines Y in the image display region 5 overlap with the plurality of TFTs 63 arrayed in the same direction in plan view. The selection signal line 62 is arranged above the TFT 63, and a protective film 652 and an organic insulating film 654 are interposed between the selection signal line 62 and the TFT 63. Further, the selection signal line 62 is covered with a protective film 656.

The protective films 652 and 656 are each a transparent insulating film made of silicon nitride ($SiN_4$) or the like similarly to the gate insulating film 635. The organic insulating film 654 is a transparent insulating film made of an organic material such as an acrylic resin. The organic insulating film 654 has a larger thickness and smaller dielectric constant than the protective films 652 and 656 or the gate insulating film 635. Therefore, it is possible to reduce the parasitic capacitance between the selection signal line 62 and the source electrode 631 of the TFT 63 and the parasitic capacitance between the selection signal line 62 and the drain electrode 632 of the TFT 63.

In each corresponding set, the selection signal line 62 and the TFT 63 are connected to each other via a hole formed through the organic insulating film 654 or the like. Specifically, a hole that reaches the gate electrode 633 of the TFT 63 at the bottom is formed through the organic insulating film 654, the protective film 652, and the gate insulating film 635, and the selection signal line 62 is connected to the gate electrode 633 of the TFT 63 via a via conductor 623 formed in the hole. Further, the semiconductor layer 634 of the TFT 63 is arranged so as to avoid the via conductor 623 and the vicinity thereof.

As described above, the selection signal line 62 overlaps with the TFT 63 in plan view. Thus, a further narrower frame can be achieved as compared to the above-mentioned embodiment illustrated in FIG. 6.

Figure 17:
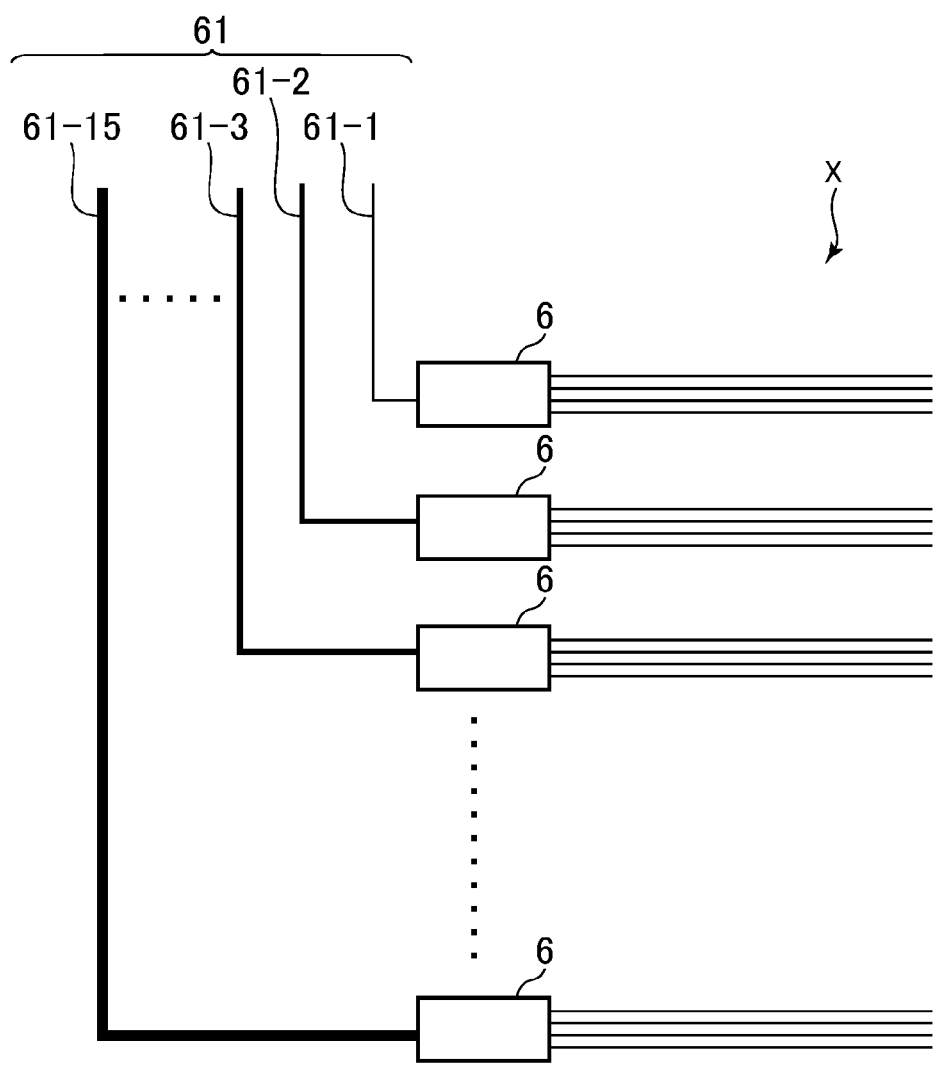
FIG. 17 is a view schematically illustrating a modified example of the scanning connection lines.

FIG. 17 is a view schematically illustrating a modified example of the scanning connection lines 61. In this embodiment, the scanning connection lines 61-1 to 61-15 are respectively connected to the plurality of selection circuits 6 located at positions different from each other in a direction parallel to the video signal lines Y in the image display region 5. Therefore, there is a difference in wiring length of each of the scanning connection lines 61-1 to 61-15 from the scanning signal drive circuit 211 to each of the selection circuits 6. When the wiring length differs in this way, the difference in resistance of each of the scanning connection lines 61-1 to 61-15 increases, which may cause a difference in display characteristics between a part of the image display region 5 relatively closer to the scanning signal drive circuit 211 and a part thereof relatively farther from the scanning signal drive circuit 211.

In view of this, in the modified example, the width of the scanning connection line 61 connected to the scanning signal lines X that are relatively farther from the scanning signal drive circuit 211 is larger as compared to the width of the scanning connection line 61 connected to the scanning signal lines X that are relatively closer to the scanning signal drive circuit 211. With this, the difference in resistance of each of the scanning connection lines 61-1 to 61-15 is reduced, to thereby enable equalization of the display characteristics.

Specifically, the widths of the scanning connection lines 61-1 to 61-15 are gradually increased as the selection circuit 6 to be connected is placed apart from the scanning signal drive circuit 211. That is, as the number increases from the scanning connection line 61-1 to be connected to the selection circuit 6 closest to the scanning signal drive circuit 211 to the scanning connection line 61-15 to be connected to the selection circuit 6 farthest from the scanning signal drive circuit 211, the widths of the scanning connection lines 61-1 to 61-15 are gradually increased. This application is not limited thereto, and the widths of the scanning connection lines 61-1 to 61-15 may be increased in a stepped manner.

Figure 18:
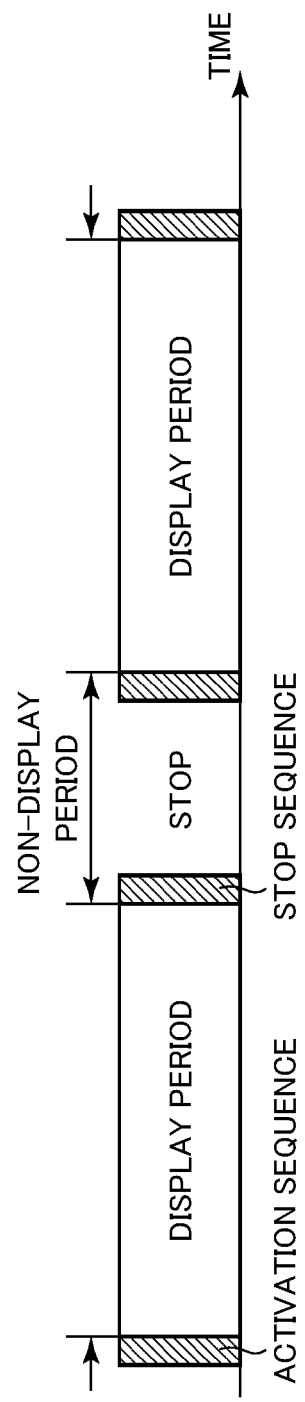
FIG. 18 is a view illustrating a timing to apply a reverse voltage.

FIG. 18 is a view illustrating the timing to apply a reverse voltage. In the TFT 63 included in the selection circuit 6 and the TFT 72 included in the selection canceling circuit 7, amorphous silicon is used, for example. Those TFTs 63 and 72 are used with a relatively high frequency as compared to the TFT 51 (see FIG. 3) in the pixel. Therefore, as the use period of the liquid crystal display device 1 (display period for displaying an image in the image display region 5) accumulates, amorphous silicon in the TFTs 63 and 72 may deteriorate, which may cause gradual increase in threshold voltages of the TFTs 63 and 72.

In view of this, in the scanning signal drive circuit 211 (example of a reverse voltage application circuit) in this modified example, during a non-display period in which no image is displayed in the image display region, a voltage having a polarity opposite to that of the selection signal is applied to each of the gate electrodes of the TFTs 63 and 72. That is, when a positive on-voltage is applied via the selection signal line 62 to each of the gate electrodes of the TFTs 63 and 72 during the display period, the scanning signal drive circuit 211 applies a negative voltage to each of the gate electrodes of the TFTs 63 and 72 during the non-display period. With this, it is possible to suppress increase of the threshold voltages of the TFTs 63 and 72 and to elongate the life of the liquid crystal display device 1.

Specifically, the reverse voltage is applied immediately before or immediately after the display period during the non-display period. That is, before and after the display period, an activation sequence and a stop sequence for activating and stopping the liquid crystal display device 1 are executed, and hence at least one period of the activation sequence and the stop sequence is used to apply the reverse voltage.

For example, the reverse voltage is applied as follows. A negative voltage (for example, −6V) is applied to all of the selection signal lines 62, and a positive voltage (for example, 18 V) is applied to all of the scanning connection lines 61, thereby applying a negative voltage (for example, −24 V) having an absolute value larger than that of the above-mentioned on-voltage between the gate and the source of the TFT 63. This state is maintained for about 0.1 to several seconds.

Figure 19:
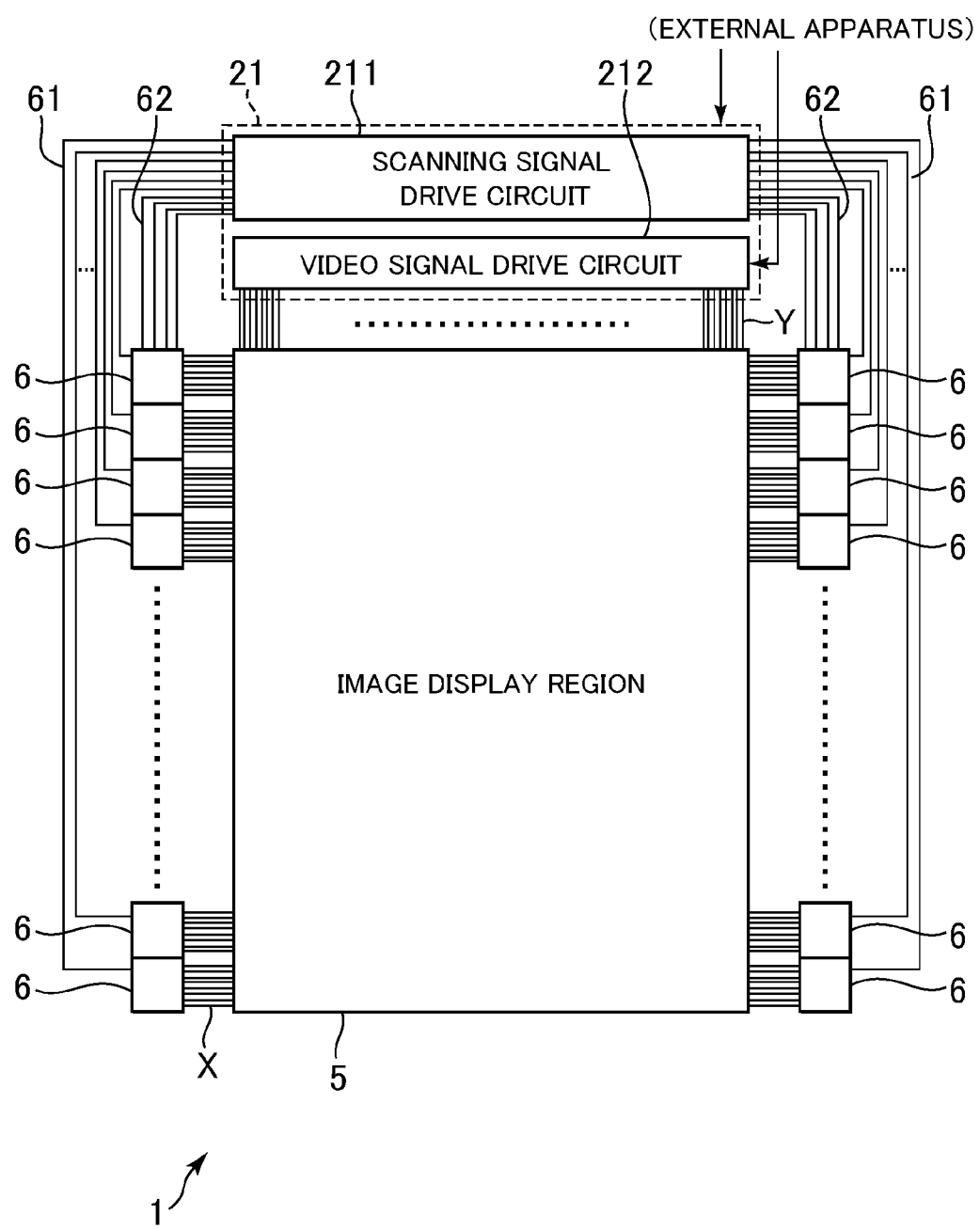
FIG. 19 is a view illustrating configurations of circuits formed on an array substrate of a liquid crystal display device according to another embodiment of this application.
Figure 20:
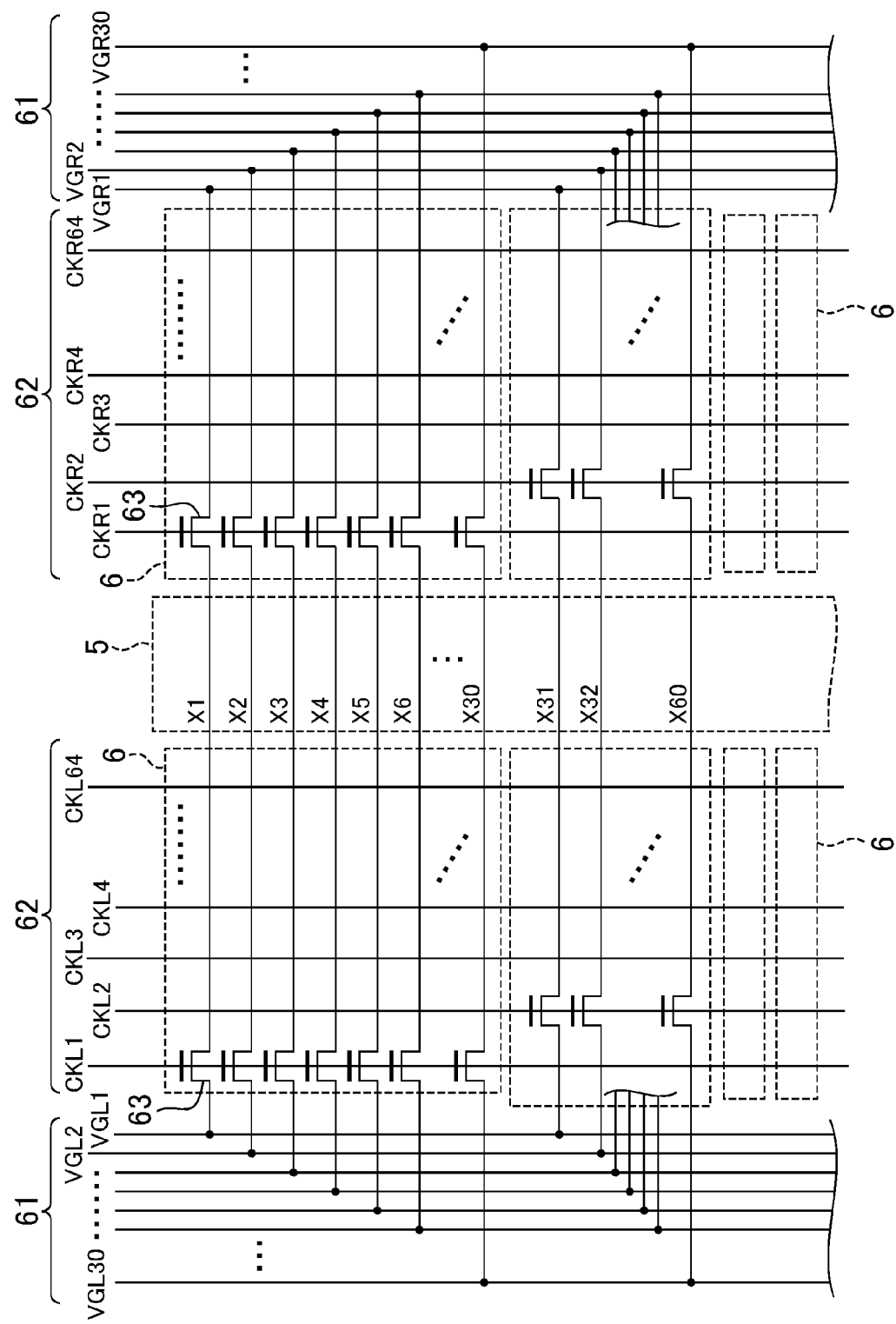
FIG. 20 is a circuit diagram of selection circuits illustrated in FIG. 19.

FIG. 19 is a view illustrating configurations of circuits formed on the array substrate 2 of the liquid crystal display device 1 according to another embodiment of this application. FIG. 20 is a circuit diagram of the selection circuit 6 illustrated in FIG. 19.

As illustrated in FIGS. 19 and 20, in the liquid crystal display device 1 according to this embodiment, the plurality of selection circuits 6 are arranged so as to oppose each other on both sides of edges (in the illustrated example, right and left edges) of the image display region 5, which are parallel to the video signal lines Y. In this embodiment, unlike the above-mentioned embodiments, the plurality of scanning connection lines 61 are led into the respective blocks of the selection circuits 6 in a branched manner to be connected via the TFTs 63 to the scanning signal lines X. Further, the TFTs 63 connected to those scanning connection lines 61 are connected in common to one of the plurality of selection signal lines 62. Note that, in this embodiment, no selection canceling circuit 7 is provided.

In this embodiment, 30 scanning connection lines 61 are formed on each of the right and left sides, and 64 selection signal lines 62 are formed on each of the right and left sides. Further, the selection circuits 6 are formed as many as the selection signal lines 62, that is, 64 selection circuits 6 are formed on each of the right and left sides. The numbers of VGL1 to VGL30 and VGR1 to VGR30 of the scanning connection lines 61 represent the order of transmission of the pulse signal. The numbers of CKL1 to CKL64 and CKR1 to CKR64 of the selection signal lines 62 represent the order of transmission of the selection signal.

The selection circuits 6 formed on the left side of the image display region 5 are described. The scanning connection lines 61 represented by VGL1 to VGL30 are led into the uppermost selection circuit 6 to be connected to the scanning signal lines X1 to X30 via the TFTs 63 connected to the selection signal line 62 represented by CKL1. Further, the scanning connection lines 61 represented by VGL1 to VGL30 are also led into the second selection circuit 6 to be connected to the scanning signal lines X41 to X60 via the TFTs 63 connected to the selection signal line 62 represented by CKL2. The same is repeated up to the 64th selection circuit 6 thereafter.

Further, the same applies to the selection circuits 6 formed on the right side of the image display region 5. The scanning connection lines 61 represented by VGR1 to VGR30 are led into the uppermost selection circuit 6 to be connected to the scanning signal lines X1 to X30 via the TFTs 63 connected to the selection signal line 62 represented by CKR1. Further, the scanning connection lines 61 represented by VGR1 to VGR30 are also led into the second selection circuit 6 to be connected to the scanning signal lines X41 to X60 via the TFTs 63 connected to the selection signal line 62 represented by CKR2. The same is repeated up to the 64th selection circuit 6 thereafter.

Figure 21:
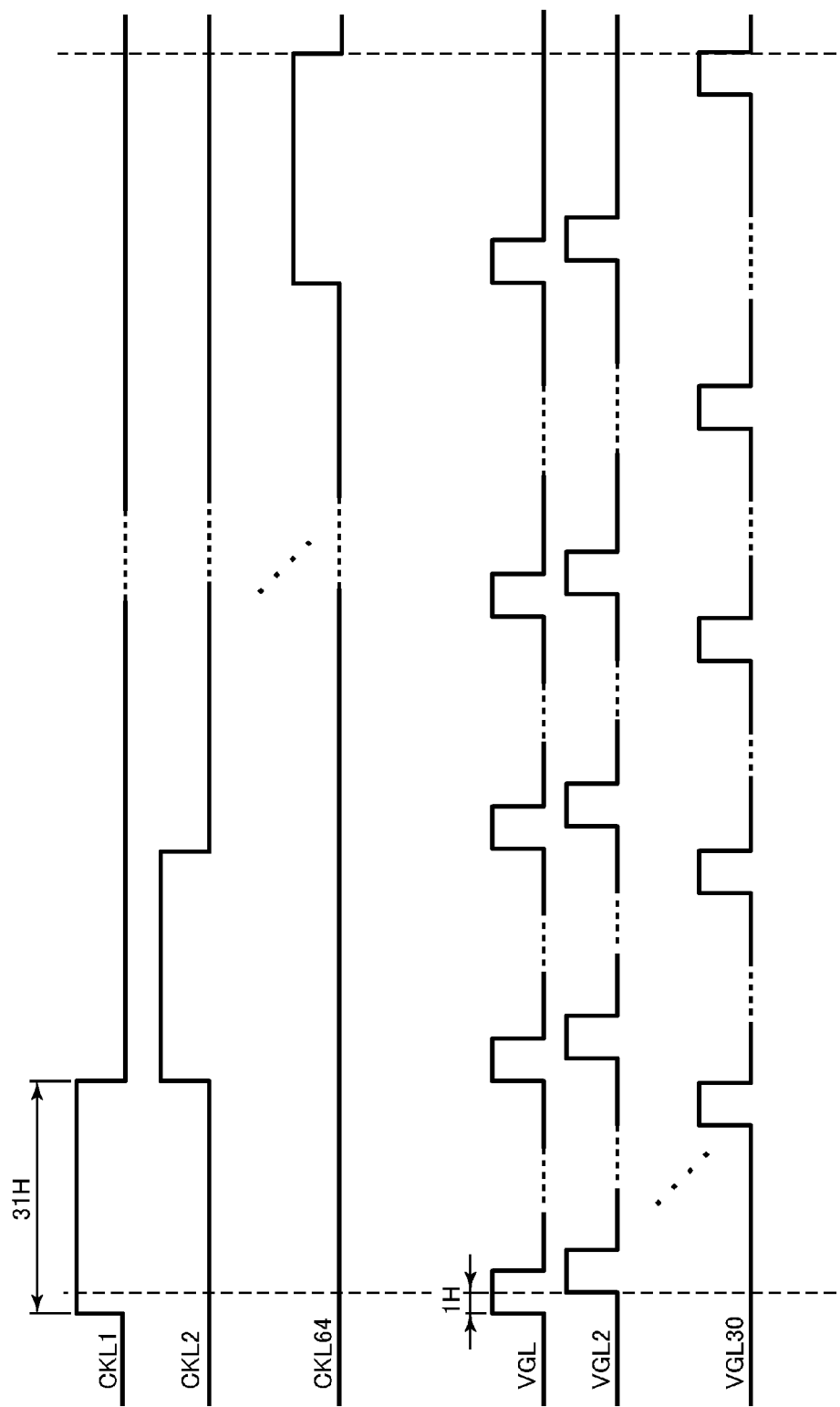
FIG. 21 is a time chart illustrating signals to be applied to scanning connection lines and selection signal lines illustrated in FIGS. 19 and 20.

FIG. 21 is a time chart illustrating signals to be applied to the scanning connection lines 61 and the selection signal lines 62 illustrated in FIGS. 19 and 20. FIG. 21 illustrates a case where the selection signal lines 62 (CKL1 to CKL64) and the scanning connection lines 61 (VGL1 to VGL30) formed on the left side are used, but the same applies also to a case where the selection signal lines 62 (CKR1 to CKR64) and the scanning connection lines 61 (VGR1 to VGR30) formed on the right side are used.

The scanning signal drive circuit 211 sequentially outputs, during a period in which the on-voltage is applied to one of the selection signal lines 62 (CKL1 to CKL64), the pulse signal to each of the scanning connection lines 61 (VGL1 to VGL30).

Specifically, the scanning signal drive circuit 211 sequentially outputs, during a period in which the on-voltage is applied to the selection signal line 62 represented by CKL1 corresponding to the uppermost selection circuit 6, the pulse signal to each of the scanning connection lines 61 represented by VGL1 to VGL30. With this, the pulse signal is sequentially input to each of the scanning signal lines X1 to X30. Further, the scanning signal drive circuit 211 sequentially outputs, during a period in which the on-voltage is applied to the selection signal line 62 represented by CKL2 corresponding to the second selection circuit 6, the pulse signal to each of the scanning connection lines 61 represented by VGL1 to VGL30. With this, the pulse signal is sequentially input to each of the scanning signal lines X31 to X60. The same is repeated up to the 64 th selection circuit 6 thereafter.

By the way, a voltage to be applied to the gate of the TFT containing amorphous silicon is generally relatively high. Also in the liquid crystal display device 1 of this embodiment, the voltage to be applied to the gate of the TFT 63 (for example, 28 V) is higher than the voltage of the pulse signal to be input to the scanning signal line X (for example, 16 V). Therefore, as in this embodiment, by sequentially outputting the pulse signal to each of the scanning connection lines 61 during the period in which the on-voltage is applied to one of the selection signal lines 62, it is possible to reduce the frequency of the selection signal with a relatively-high on-voltage to be supplied to the selection signal line 62 as compared to other embodiments. As a result, in the liquid crystal display device 1 of this embodiment, it is possible to suppress power consumption as compared to the other embodiments.

Note that, when one scanning period in which one scanning signal line X is scanned is represented by 1H, the pulse width (period) of the pulse signal to be sequentially output to each of the scanning connection lines 61 represented by VGL1 to VGL30 is set to 2H, and the period in which the on-voltage is applied to the scanning connection lines 61 is set to 31H. The reason for this setting is because, as illustrated in FIGS. 12 and 13, the timing at which the TFT 51 in the pixel connected to the scanning signal line Xn is turned on is set earlier by 1H than the timing at which the voltage dn is applied to the TFT 51 via the video signal line Y. With this, even when the one scanning period (1H) is reduced along with the increase in resolution of the image display region 5, it is possible to sufficiently secure the pixel charging time period.

Referring back to FIGS. 19 and 20, in this embodiment, the left end portions of the scanning signal lines X are connected via the TFTs 63 to the respective scanning connection lines 61 (VGL1 to VGL30) formed on the left side, and the right end portions of the scanning signal lines X are connected via the TFTs 63 to the scanning connection lines 61 (VGR1 to VGR30) formed on the right side. Therefore, input of the pulse signal is possible from both of the right and left sides. Therefore, an alternate usage mode is possible, such as using the selection circuits 6 formed on one of both the right and left sides for input of the pulse signal and resting the selection circuits 6 formed on the other side.

Figure 22:
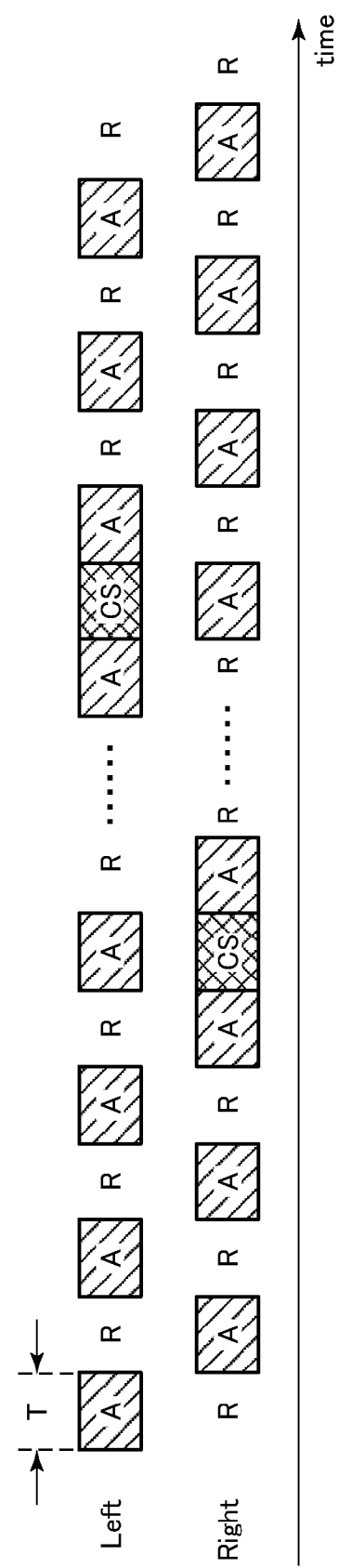
FIG. 22 is a time chart illustrating an operation timing of the selection circuits illustrated in FIGS. 19 and 20.

FIG. 22 is a time chart illustrating such an alternate usage mode. In FIG. 22, A represents a drive period, and R represents a resting period. In this embodiment, the side to be used for input of the pulse signal of the selection circuits 6 formed on both the right and left sides is switched for every certain period T. In the resting period R, no selection signal is supplied, that is, no on-voltage is applied to the selection signal line 62 connected to the selection circuit 6 to be rested. In addition, no pulse signal may be supplied to the scanning connection line 61 connected to the selection circuit 6 to be rested.

Further, in FIG. 22, CS represents a reverse voltage application period. The reverse voltage application period CS is provided at a part of positions corresponding to the resting periods R (that is, positions at which the counterpart is the drive period A) instead of the resting period R. The frequency of the reverse voltage application period is set to, for example, about once in 1,000 times of the resting period R. Further, the switching period T is, for example, about 0.1 to several seconds.

In the reverse voltage application period CS, as described above with reference to FIG. 18, a voltage having a polarity opposite to that of the selection signal is applied to the gate electrode of the TFT 63. That is, when a positive on-voltage is applied via the selection signal line 62 to the gate electrode of the TFT 63 in the drive period A, the scanning signal drive circuit 211 applies a negative voltage to the gate electrode of the TFT 63 in the reverse voltage application period CS. With this, it is possible to suppress increase of the threshold voltage of the TFT 63 and to elongate the life of the liquid crystal display device 1.

For example, in the reverse voltage application period CS, a negative voltage (for example, −6 V) is applied to all of the selection signal lines 62 to be rested, and a positive voltage (for example, 18 V) is applied to all of the scanning connection lines 61, thereby applying a negative voltage (for example, −24 V) having an absolute value larger than that of the above-mentioned on-voltage between the gate and the source of the TFT 63.

The alternate usage mode for the selection circuits 6 formed on both of the right and left sides has been described above, but this application is not limited thereto. The selection circuits 6 formed on both of the right and lefts sides may all be used for input of the pulse signal. In this case, the TFT 63 included in the selection circuit 6 can be downsized, and hence a narrower frame can be expected in the liquid crystal display device 1. Note that, the selection circuits 6 may be formed on only one of the right and left sides.

Figure 23:
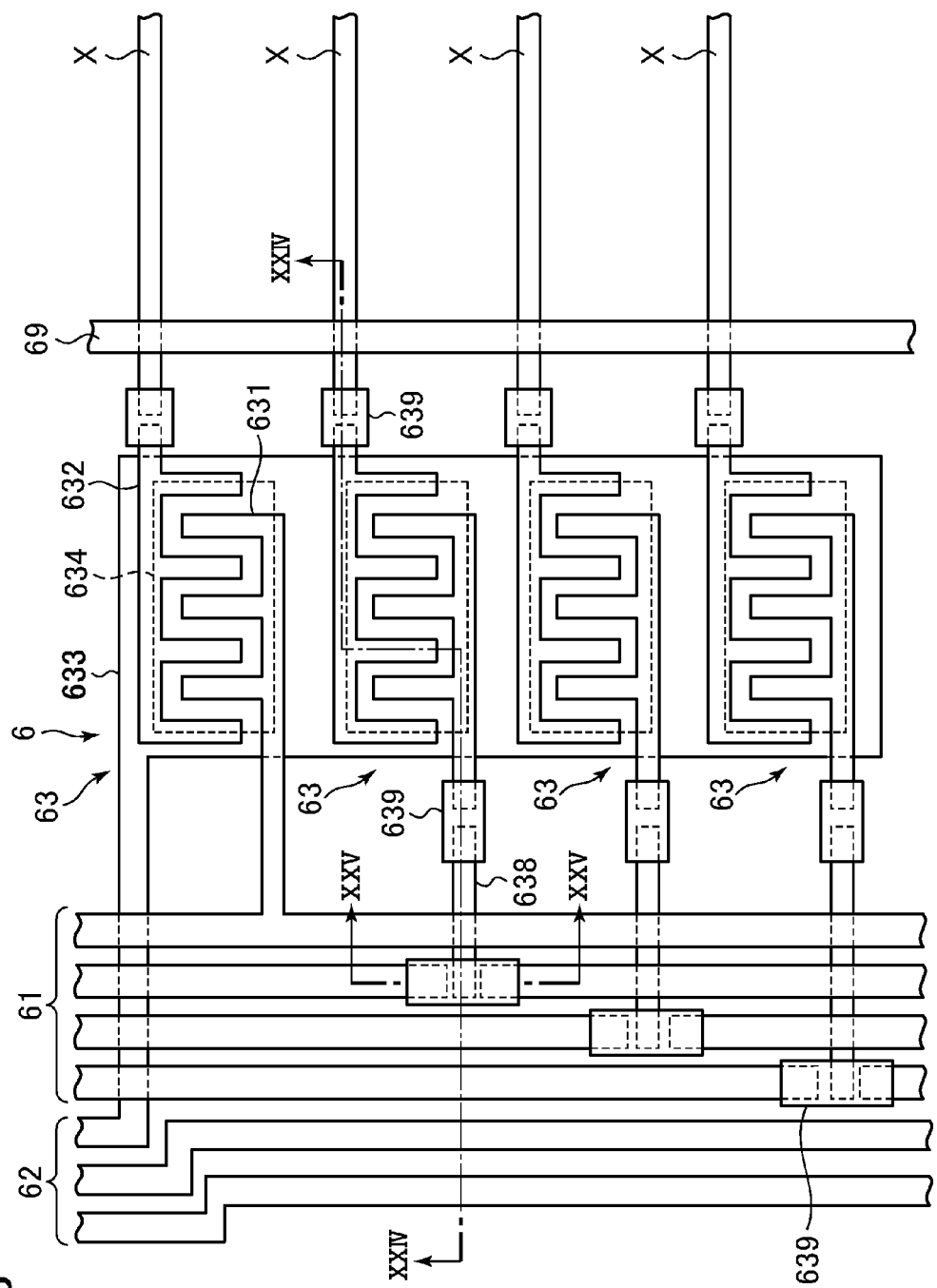
FIG. 23 is a plan view schematically illustrating a part of the selection circuit formed on the array substrate and a peripheral portion thereof.
Figure 24:
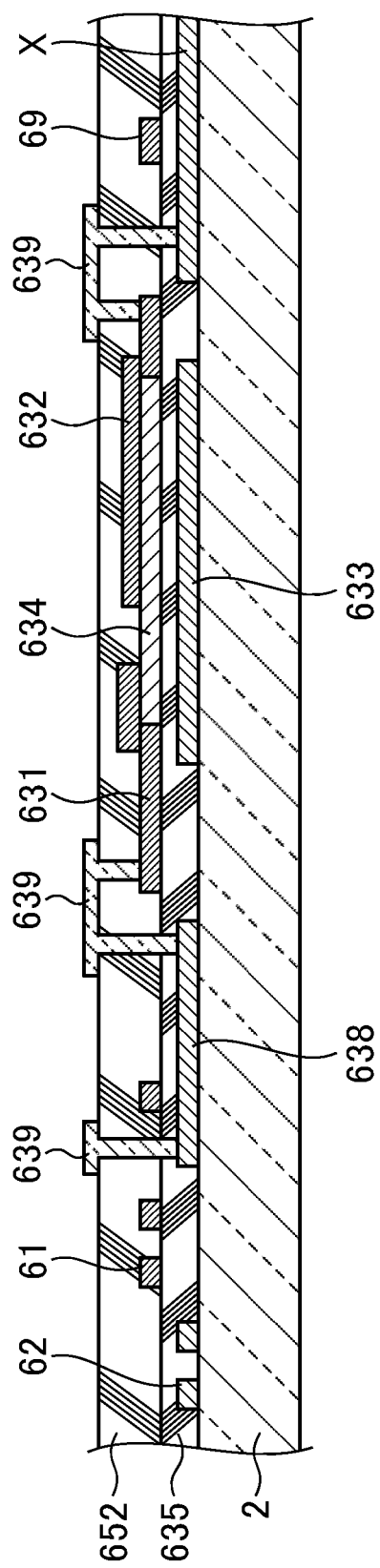
FIG. 24 is a partial sectional view of the liquid crystal display device taken along the line XXIV-XXIV of FIG. 23.
Figure 25:
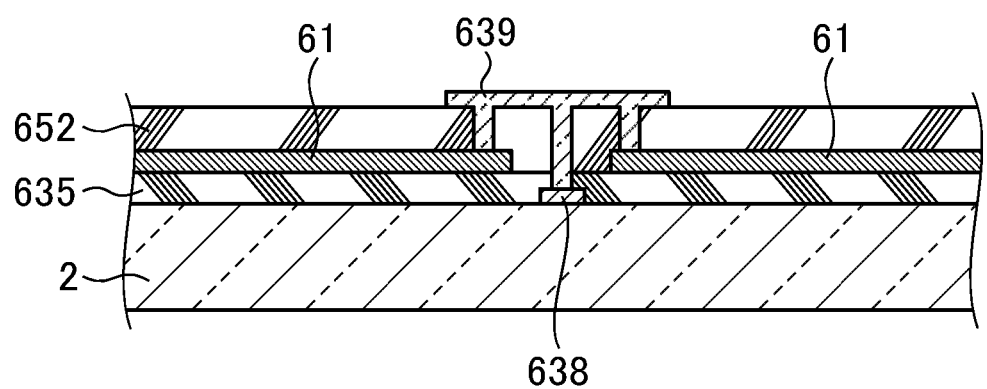
FIG. 25 is a partial sectional view of the liquid crystal display device taken along the line XXV-XXV of FIG. 23.

FIG. 23 is a plan view schematically illustrating a part of the selection circuit 6 formed on the array substrate 2 and a peripheral portion thereof. FIG. 24 is a partial sectional view taken along the line XXIV-XXIV of FIG. 23. FIG. 25 is a partial sectional view taken along the line XXV-XXV of FIG. 23. The basic configuration of the selection circuit 6 in this embodiment is similar to the above-mentioned configuration illustrated in FIGS. 6 to 8.

In this embodiment, a lower metal film (selection signal line 62, gate electrode 633, scanning signal line X, and the like) arranged between the array substrate 2 and the gate insulating film 635 and an upper metal film (scanning connection line 61, source electrode 631, drain electrode 632, and the like) arranged between the gate insulating film 635 and the protective film 652 are connected to each other by a connection conductor 639 formed on the protective film 652. The connection conductor 639 is connected to the lower metal film via a hole passing through the protective film 652 and the gate insulating film 635, and is further connected to the upper metal film via a hole passing through the protective film 652. The connection conductor 639 is made of, for example, indium tin oxide (ITO).

Further, the scanning connection line 61 and the source electrode 631 arranged between the gate insulating film 635 and the protective film 652 are connected to each other via bypass wiring 638 arranged between the array substrate 2 and the gate insulating film 635 and via the connection conductors 639 provided at both end portions of the bypass wiring 638.

By the way, the configurations arranged outside the image display region 5, such as the selection circuit 6, the scanning connection line 61, and the selection signal line 62, are formed together with the configurations arranged inside the image display region 5 during the manufacturing process of the array substrate 2. For example, the TFT 63 of the selection circuit 6 is formed together with the TFT 51 (see FIG. 3) of the image display region 5. Further, the connection conductor 639 is formed together with the pixel electrode or the common electrode formed in the pixel of the image display region 5.

As described above, with the connection conductor 639 formed together with the pixel electrode or the common electrode and arranged on the protective film 652, the lower metal film and the upper metal film are connected to each other. In this manner, the connection conductor 639 can be formed without adding a new step to the manufacturing process of the array substrate 2. That is, when the lower metal film and the upper metal film are connected to each other by passing only through the gate insulating film 635, it is necessary to add a step of forming a hole through the gate insulating film 635 after the gate insulating film 635 is formed before the protective film 652 is formed, but by forming the connection conductor 639 together with the pixel electrode or the common electrode as in this embodiment, it is unnecessary to add a new step.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A display device, comprising:
   an image display region comprising a plurality of pixels defined by a plurality of scanning signal lines and a plurality of video signal lines;
   a plurality of blocks, each of which includes a plurality of selection TFTs formed outside the image display region, each selection TFT having a gate electrode, a source electrode, and a drain electrode connected to a corresponding one of the plurality of scanning signal lines, each of the selection TFTs in one of the blocks having a corresponding selection TFT in the other blocks;
   a plurality of scanning connection lines formed outside the image display region, each scanning connection line connected to all source electrodes of the plurality of selection TFTs included in a corresponding one of the plurality of blocks;
   a plurality of selection signal lines, each of which is connected to the gate electrodes of one set of the corresponding selection TFTs in the plurality of blocks, the corresponding selection TFTs that are connected to one of the plurality of selection signal lines being different from the corresponding selection TFTs that are connected to the other of the plurality of selection signal lines;
   a scanning signal drive circuit providing selection signals to the plurality of selection signal lines, respectively, and applying on-voltages to the plurality of scanning connection lines, respectively; and
   an insulating film interposed between the gate electrodes of the plurality of selection TFTs and the selection signal lines,
   wherein the gate electrodes of the plurality of selection TFTs and the selection signal lines overlap with each other in plan view, respectively, and
   the gate electrodes of the plurality of selection TFTs and the selection signal lines are connected to each other via holes formed through the insulating film, respectively.

2. The display device according to claim 1, wherein one end of each scanning signal line is connected to the drain electrode of a corresponding one of the plurality of selection TFTs,
   the other end of each scanning signal line is connected to a corresponding one of a plurality of canceling TFTs,
   the plurality of canceling TFTs are configured to selectively short-circuit one of the plurality of scanning signal lines to one of a plurality of selection canceling signal lines based on the selection signals.

3. The display device according to claim 2, wherein the plurality of selection TFTs are formed on a side of one of the edges of the image display region that are parallel to the plurality of video signal lines, and
   the plurality of canceling TFTs are formed on a side of the other of the edges of the image display region that are parallel to the plurality of video signal lines.

4. The display device according to claim 1, wherein at least one of the plurality of scanning connection lines is formed in a same layer as the gate electrodes of the selection TFTs.

5. The display device according to claim 1, wherein at least one of the plurality of scanning connection lines is formed in a same layer as the selection signal lines.

6. The display device according to claim 1, further comprising a sealing material for bonding an array substrate and a color filter substrate to each other, the sealing material being formed at a position overlapping with the plurality of scanning connection lines in plan view.

7. The display device according to claim 1, wherein a supply start timing to supply the selection signal to a first selection signal line is earlier than a supply start timing to supply signal voltages corresponding to pixel values via the plurality of video signal lines to pixels corresponding to the first selection signal line.

8. The display device according to claim 1, comprising a reverse voltage application circuit configured to apply, to the gate electrodes of one set of the corresponding selection TFTs via the corresponding one of the plurality of selection signal lines, a voltage having a polarity opposite to a polarity of the selection signal during a non-display period during which no image is displayed in the image display region.

9. A display device, comprising:
   an image display region comprising a plurality of pixels sectioned by a plurality of scanning signal lines and a plurality of video signal lines;
   a plurality of blocks, each of which includes a plurality of selection TFTs formed outside the image display region, each selection TFT having a gate electrode, a source electrode, and a drain electrode connected to a corresponding one of the plurality of scanning signal lines, each of the selection TFTs in one of the blocks having a corresponding selection TFT in the other blocks;

a plurality of scanning connection lines formed outside the image display region, each scanning connection line connected to all source electrodes of the plurality of selection TFTs included in a corresponding one of the plurality of blocks;

a plurality of selection signal lines, each of which is connected to the gate electrodes of one set of the corresponding selection TFTs in the plurality of blocks, the corresponding selection TFTs that are connected to one of the plurality of selection signal lines being different from the corresponding selection TFTs that are connected to the other of the plurality of selection signal lines;

a scanning signal drive circuit providing selection signals to the plurality of selection signal lines, respectively, and applying on-voltages to the plurality of scanning connection lines, respectively; and an insulating film interposed between the source electrodes of the plurality of selection TFTs and the scanning connection lines, wherein the source electrodes of the plurality of selection TFTs and the scanning connection lines overlap with each other in plan view, respectively, and the source electrodes of the plurality of selection TFTs and the scanning connection lines are connected to each other via holes formed through the insulating film, respectively.

10. The display device according to claim 9, wherein one end of each scanning signal line is connected to the drain electrode of a corresponding one of the plurality of selection TFTs, the other end of each scanning signal line is connected to a corresponding one of a plurality of canceling TFTs, the plurality of canceling TFTs are configured to selectively short-circuit one of the plurality of scanning signal lines to one of a plurality of selection canceling signal lines based on the selection signals.

11. The display device according to claim 10, wherein the plurality of selection TFTs are formed on a side of one of the edges of the image display region that are parallel to the plurality of video signal lines, and the plurality of canceling TFTs are formed on a side of the other of the edges of the image display region that are parallel to the plurality of video signal lines.

12. The display device according to claim 9, wherein at least one of the plurality of scanning connection lines is formed in a same layer as the gate electrodes of the selection TFTs.

13. The display device according to claim 9, wherein at least one of the plurality of scanning connection lines is formed in a same layer as the selection signal lines.

* * * * *